(12) United States Patent
Castelli et al.

(10) Patent No.: US 9,289,093 B2
(45) Date of Patent: Mar. 22, 2016

(54) BREWING ASSEMBLY AND BEVERAGES PRODUCTION MACHINE COMPRISING SAID ASSEMBLY

(75) Inventors: Cristiano Castelli, Porretta Terme (IT); Stefano Tonelli, Gaggio Montano (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 189 days.

(21) Appl. No.: 13/981,400

(22) PCT Filed: Feb. 6, 2012

(86) PCT No.: PCT/IB2012/050526
§ 371 (c)(1),
(2), (4) Date: Jul. 24, 2013

(87) PCT Pub. No.: WO2012/114218
PCT Pub. Date: Aug. 30, 2012

(65) Prior Publication Data
US 2013/0319252 A1 Dec. 5, 2013

(30) Foreign Application Priority Data
Feb. 25, 2011 (EP) .................................... 11156013

(51) Int. Cl.
*A47J 31/40* (2006.01)
*A47J 31/36* (2006.01)
*A47J 31/44* (2006.01)

(52) U.S. Cl.
CPC .............. *A47J 31/36* (2013.01); *A47J 31/3614* (2013.01); *A47J 31/3619* (2013.01); *A47J 31/3633* (2013.01); *A47J 31/4403* (2013.01)

(58) Field of Classification Search
CPC ..... A47J 31/3614; A47J 31/3619; A47J 31/44; A47J 31/4403
USPC ........................ 99/302 P, 302 R, 289 R, 284
See application file for complete search history.

(56) References Cited

U.S. PATENT DOCUMENTS

| 3,260,190 | A | * | 7/1966 | Levinson | ........................ 99/295 |
| 5,964,142 | A | * | 10/1999 | Tio | ............................... 99/289 R |
| 6,453,800 | B1 | * | 9/2002 | Chen | ........................... 99/289 R |
| 7,024,985 | B2 | * | 4/2006 | Park | ............................. 99/302 P |
| 7,370,572 | B2 | * | 5/2008 | De'Longhi | .................. 99/302 P |
| 8,402,882 | B2 | * | 3/2013 | De' Longhi | ................ 99/289 R |
| 8,973,486 | B2 | * | 3/2015 | Frigeri et al. | ................ 99/289 P |

FOREIGN PATENT DOCUMENTS

| EP | 0885581 | A1 | 12/1998 |
| EP | 0931491 | A1 | 7/1999 |
| EP | 1336365 | A1 | 8/2003 |

* cited by examiner

*Primary Examiner* — Reginald L Alexander

(57) ABSTRACT

A brewing assembly includes a brewing chamber, a support structure carrying first and second portions of the brewing chamber, and a boiler for heating water. The support structure has a first part which is fastened to the first portion of the brewing chamber, and a second part which is fastened to the second portion of the brewing chamber. The first and second parts of the support structure can be mutually coupled and uncoupled. The first and second portions of the brewing chamber are mutually mobile to adopt an open position, and a closed position when the first and second parts of the support structure are coupled. The boiler is rigidly connected to one of the parts of the support structure and to one of the portions of the brewing chamber.

22 Claims, 19 Drawing Sheets

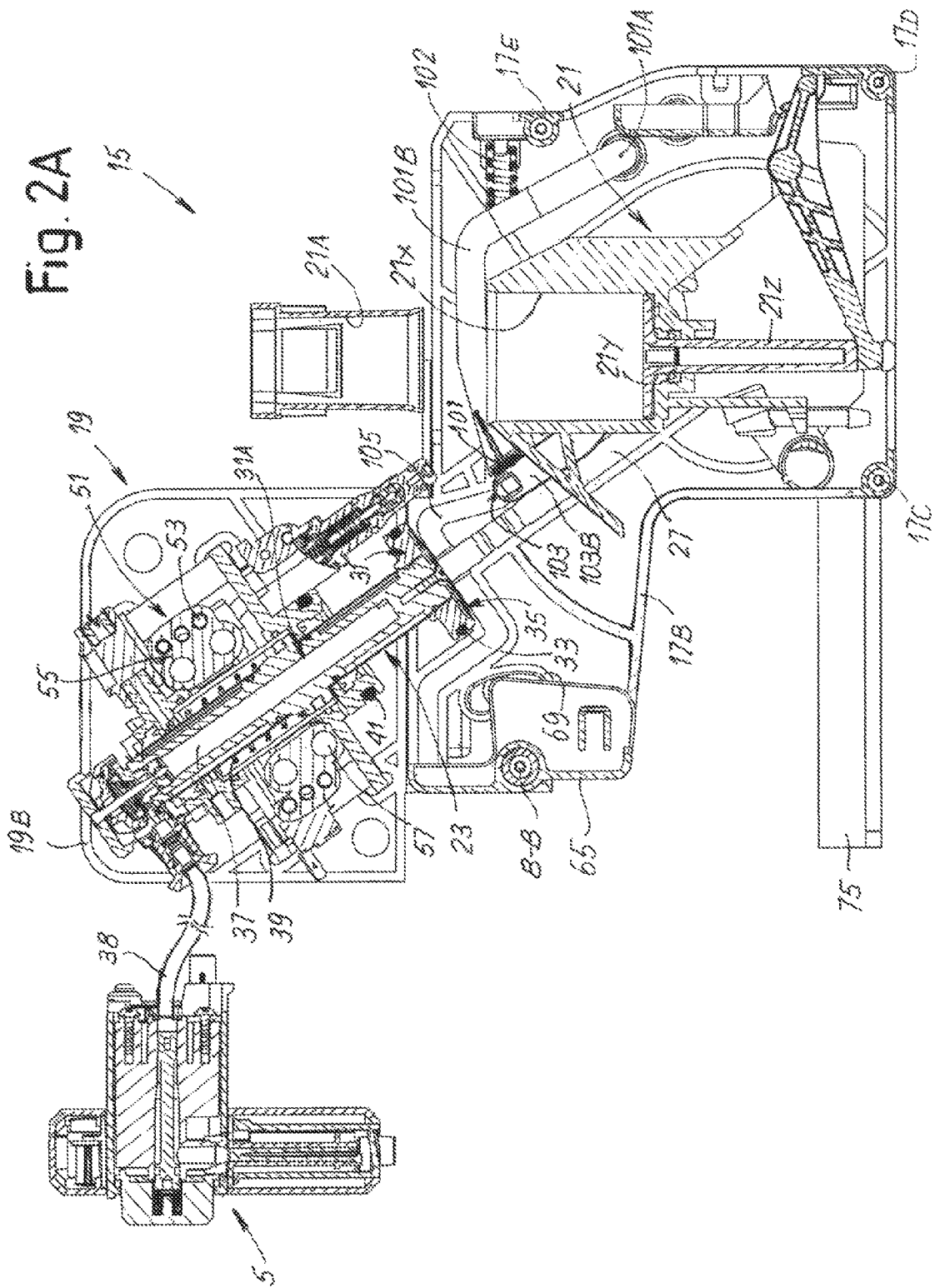

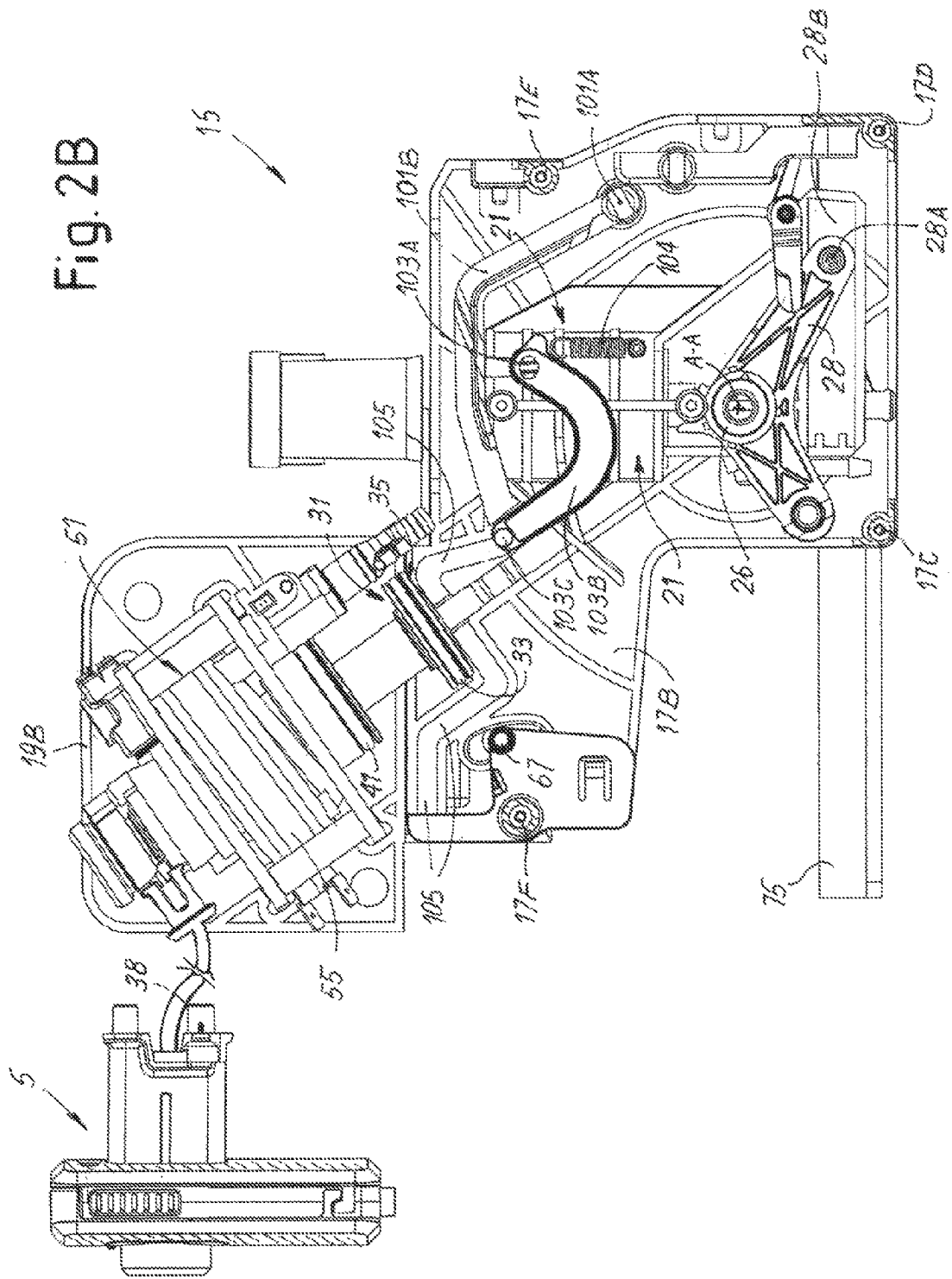

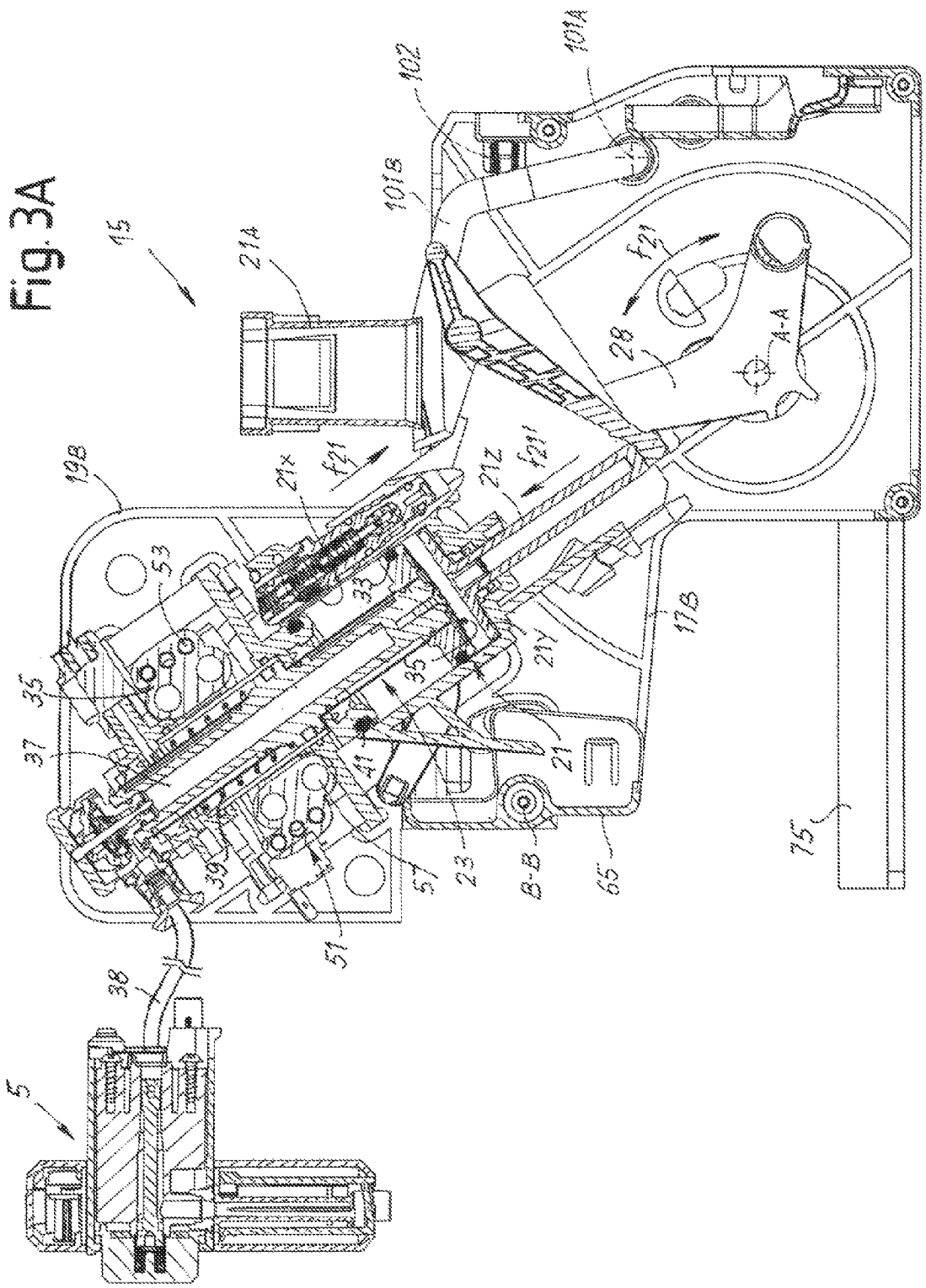

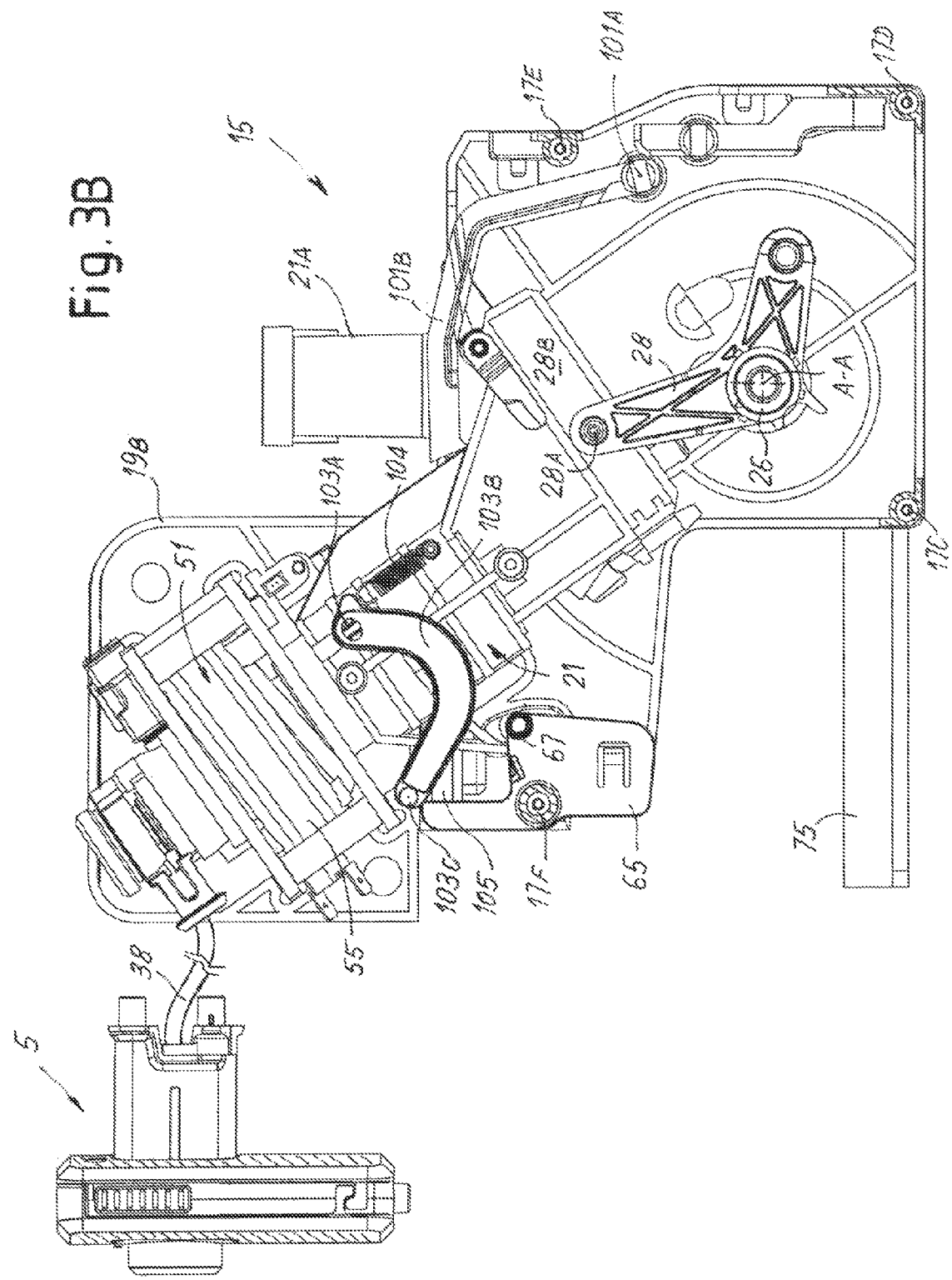

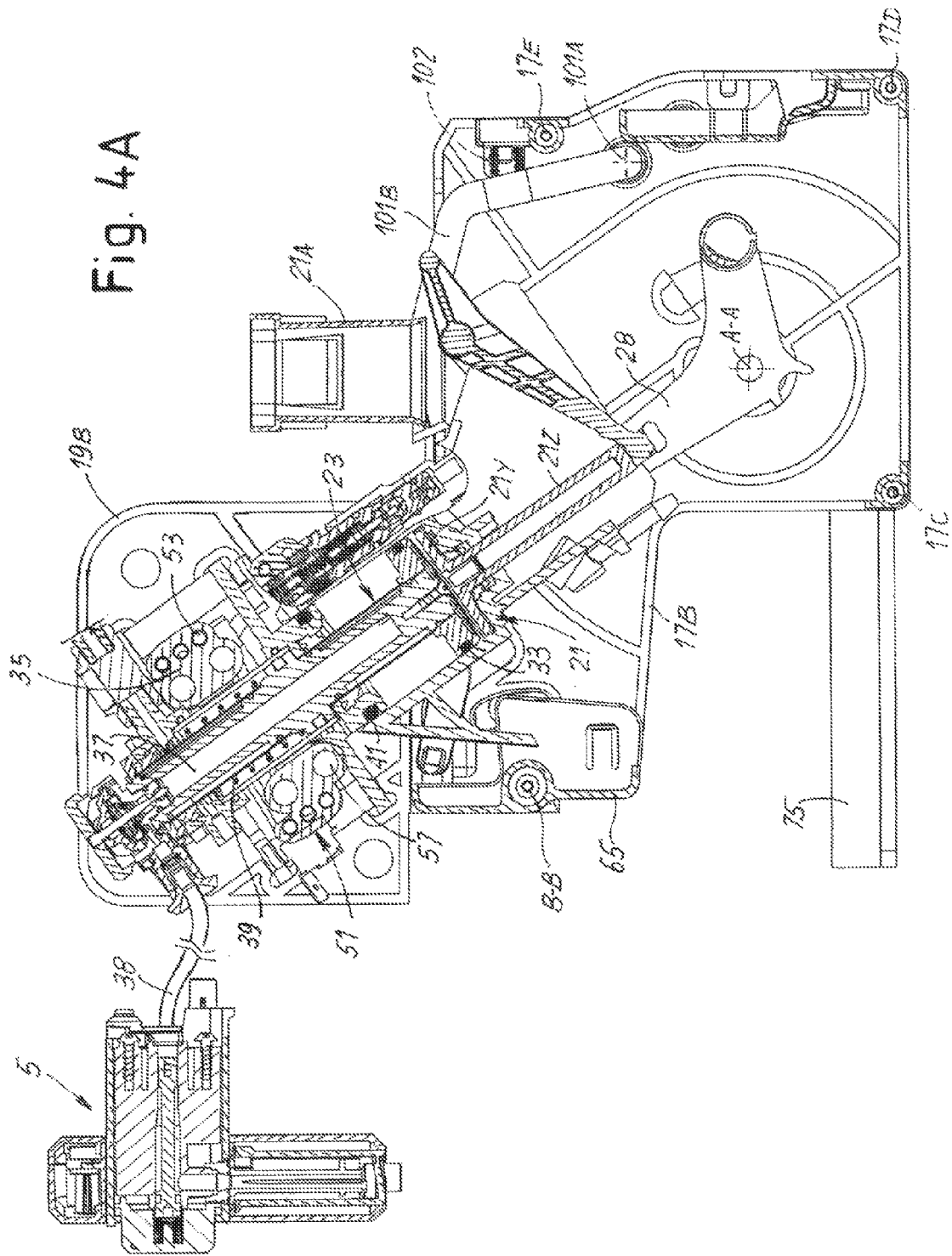

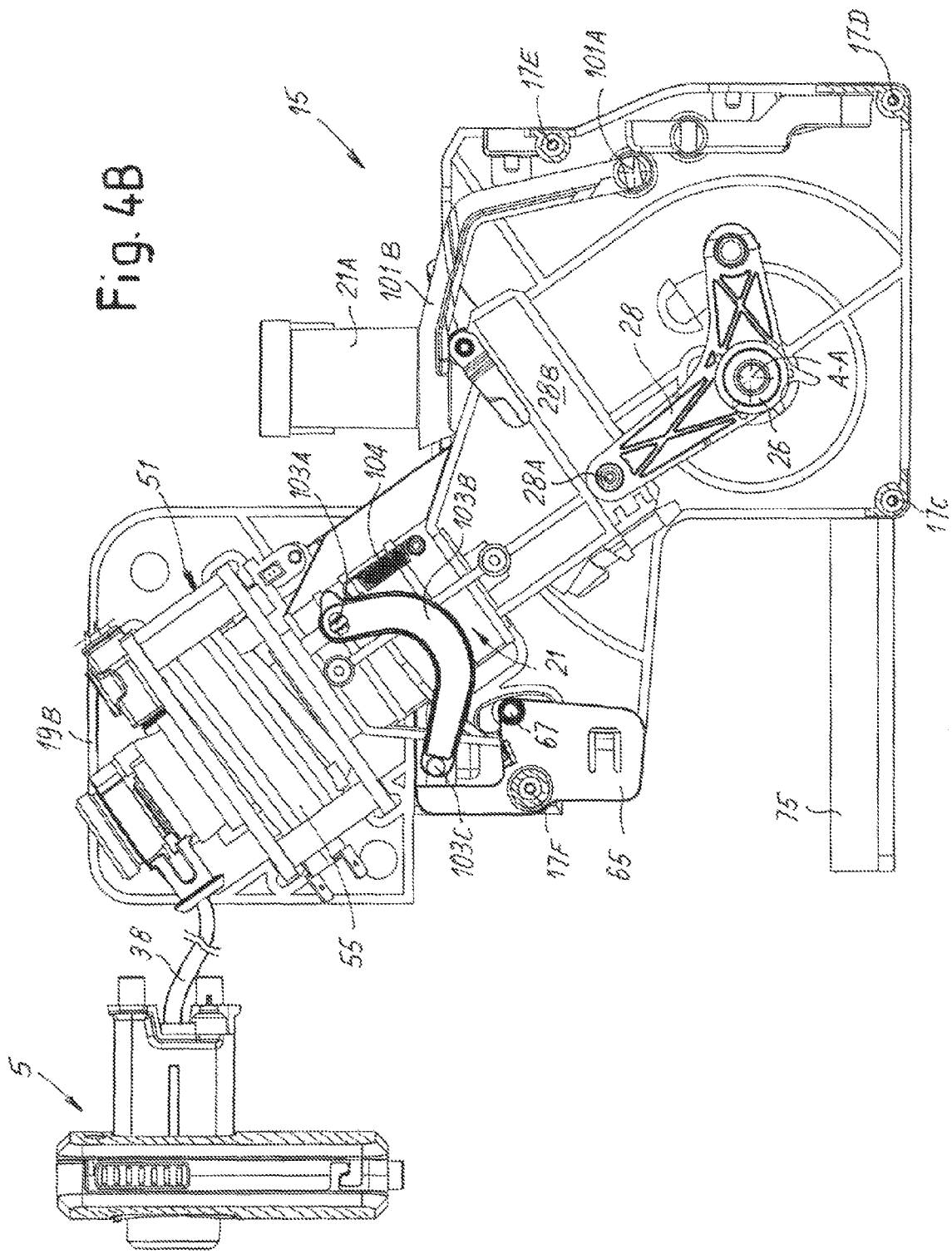

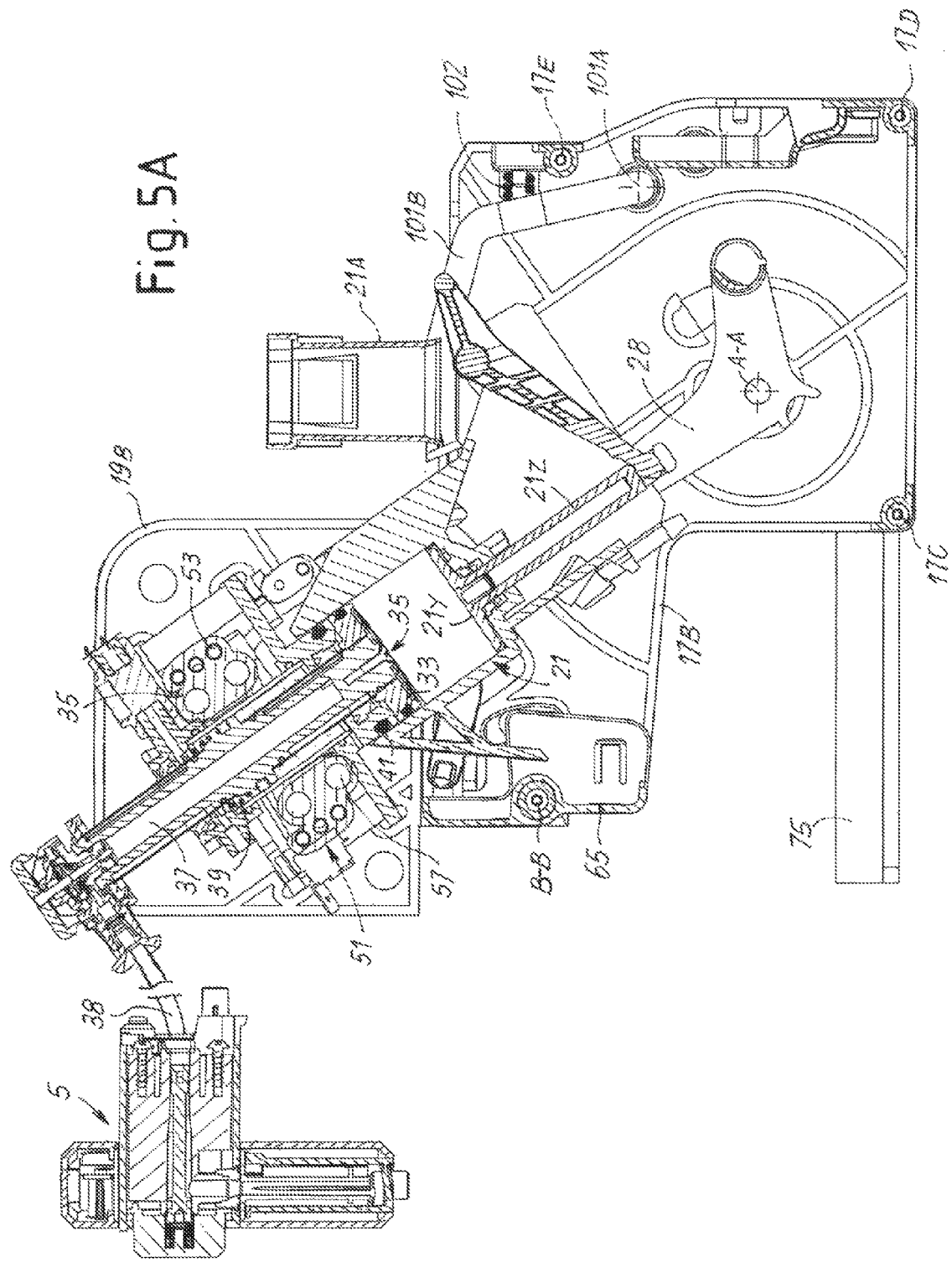

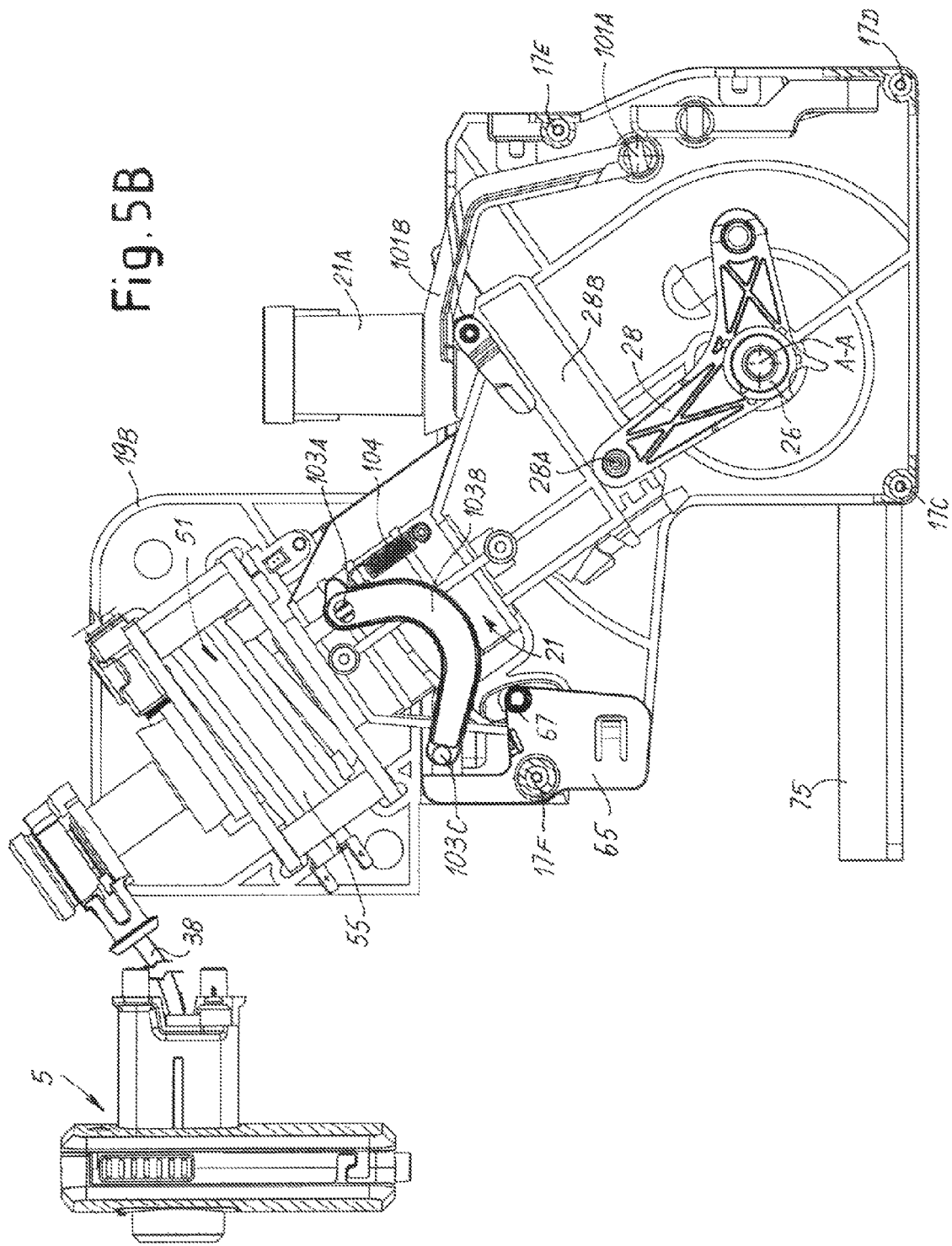

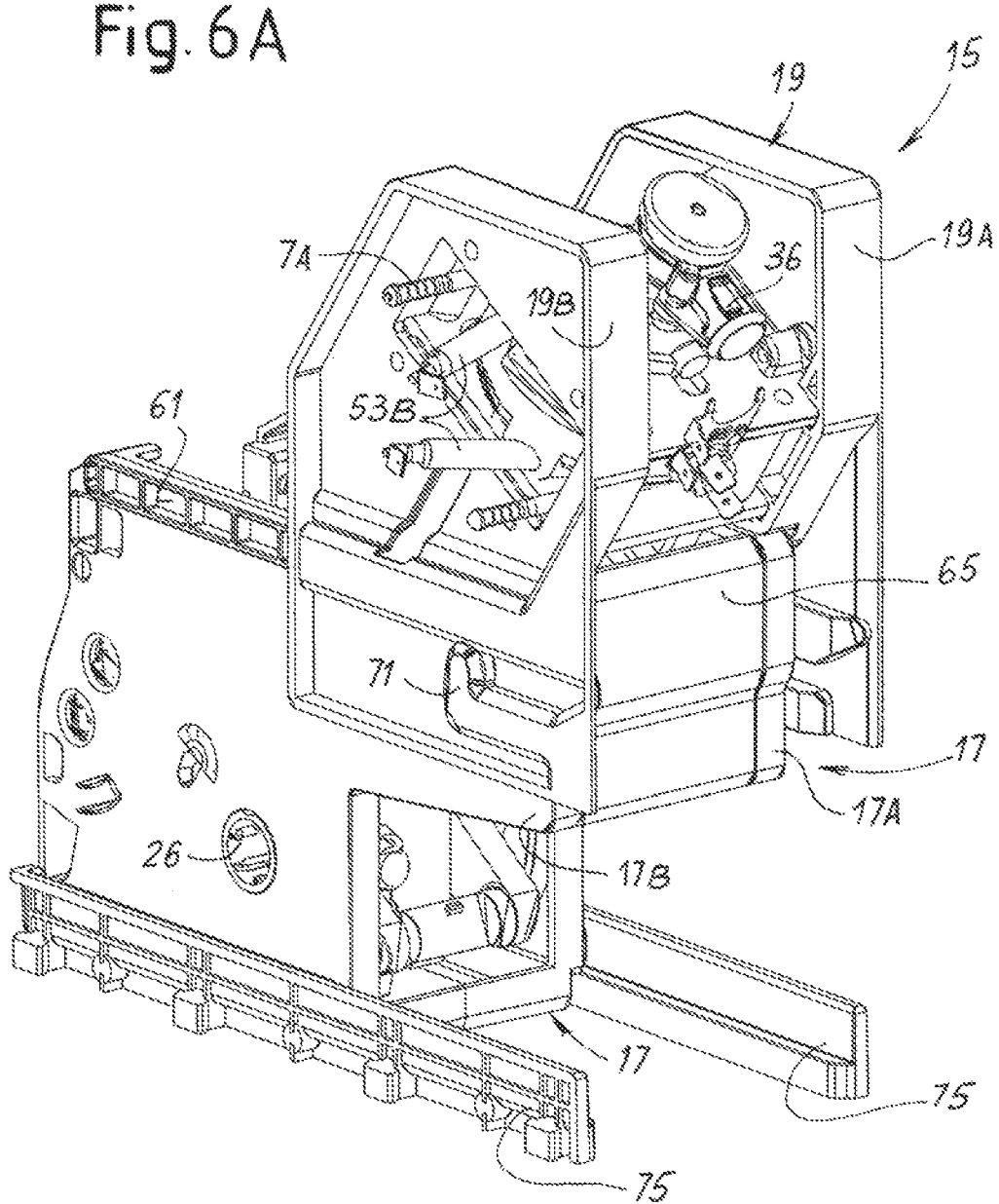

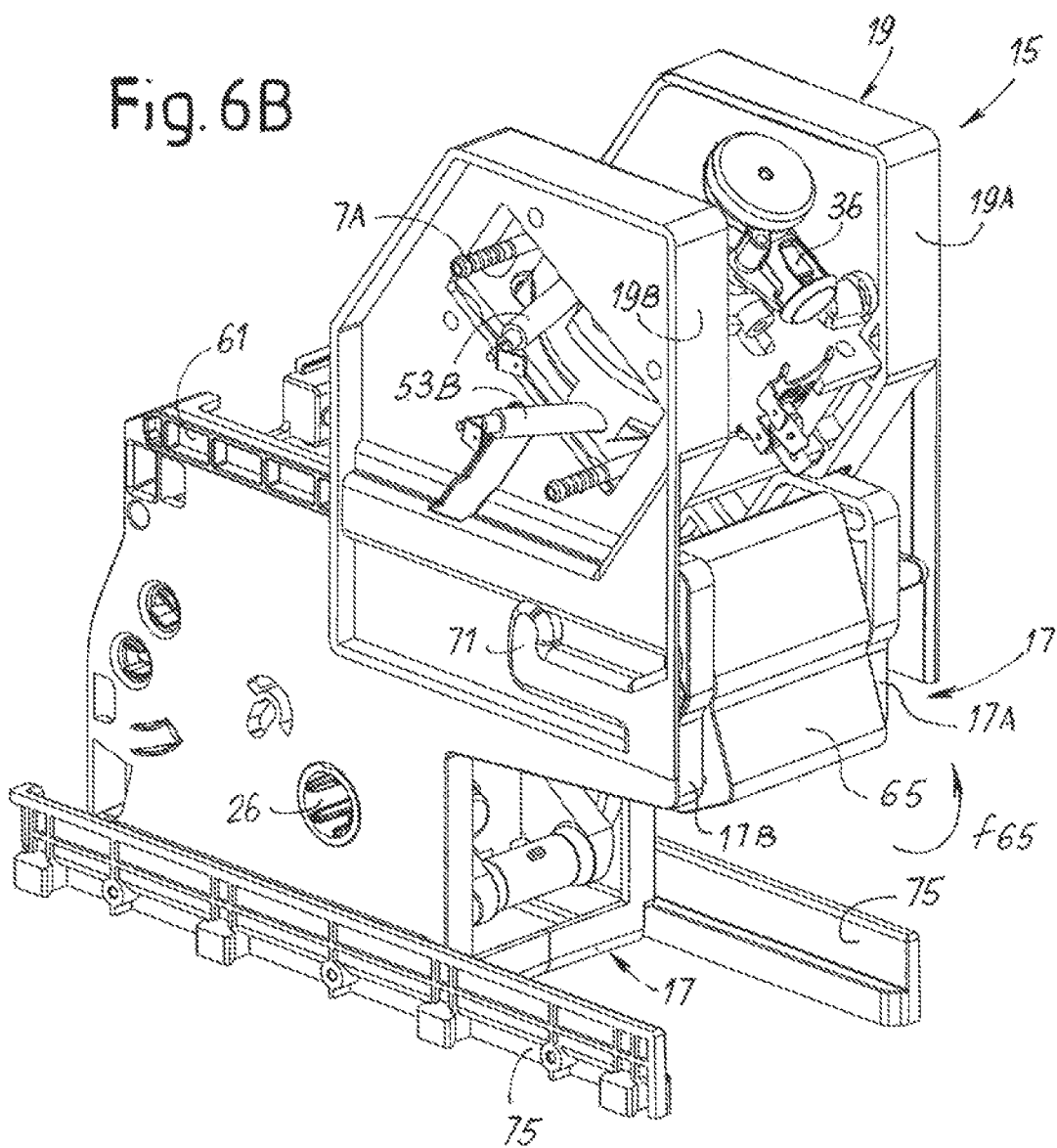

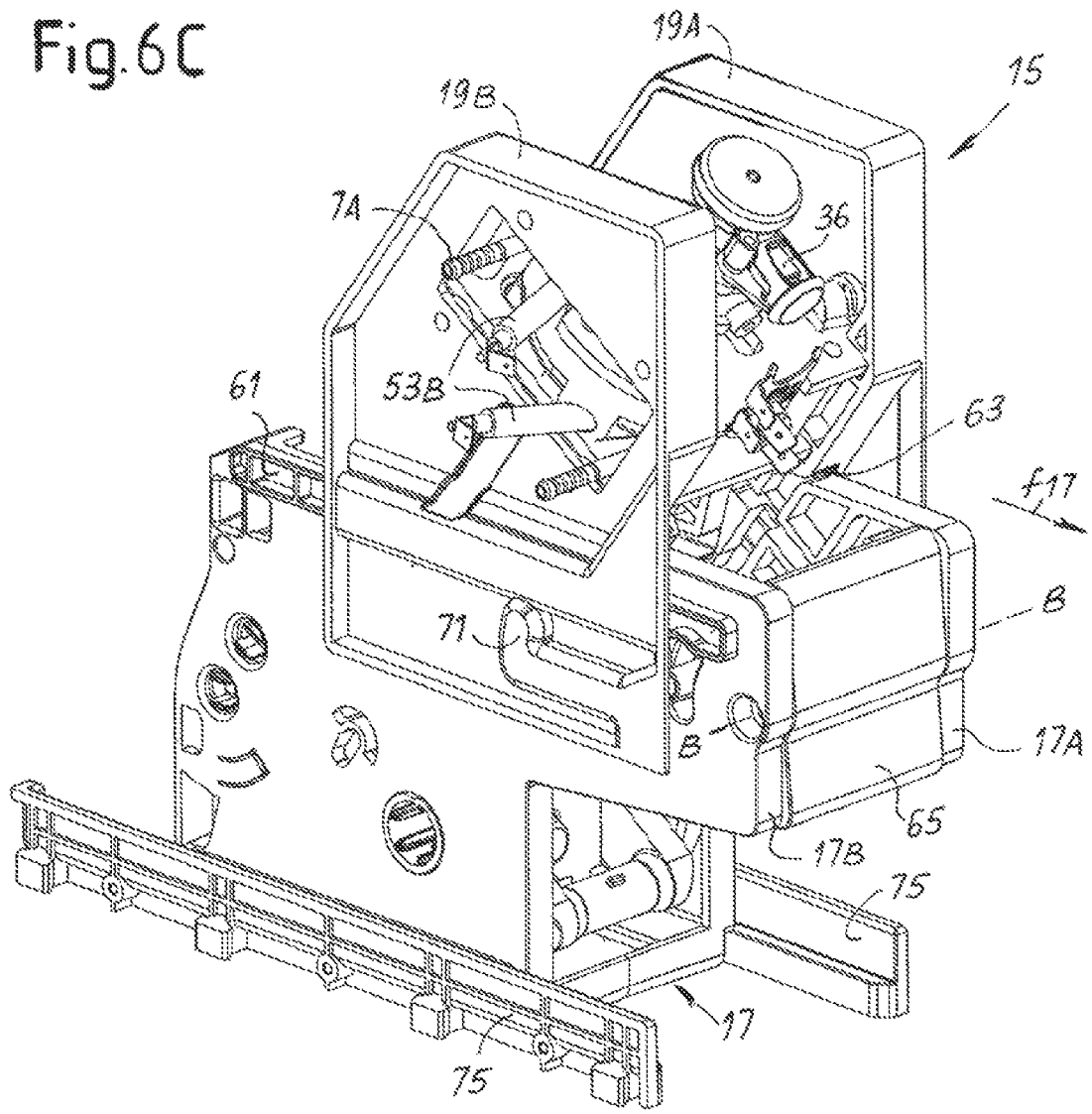

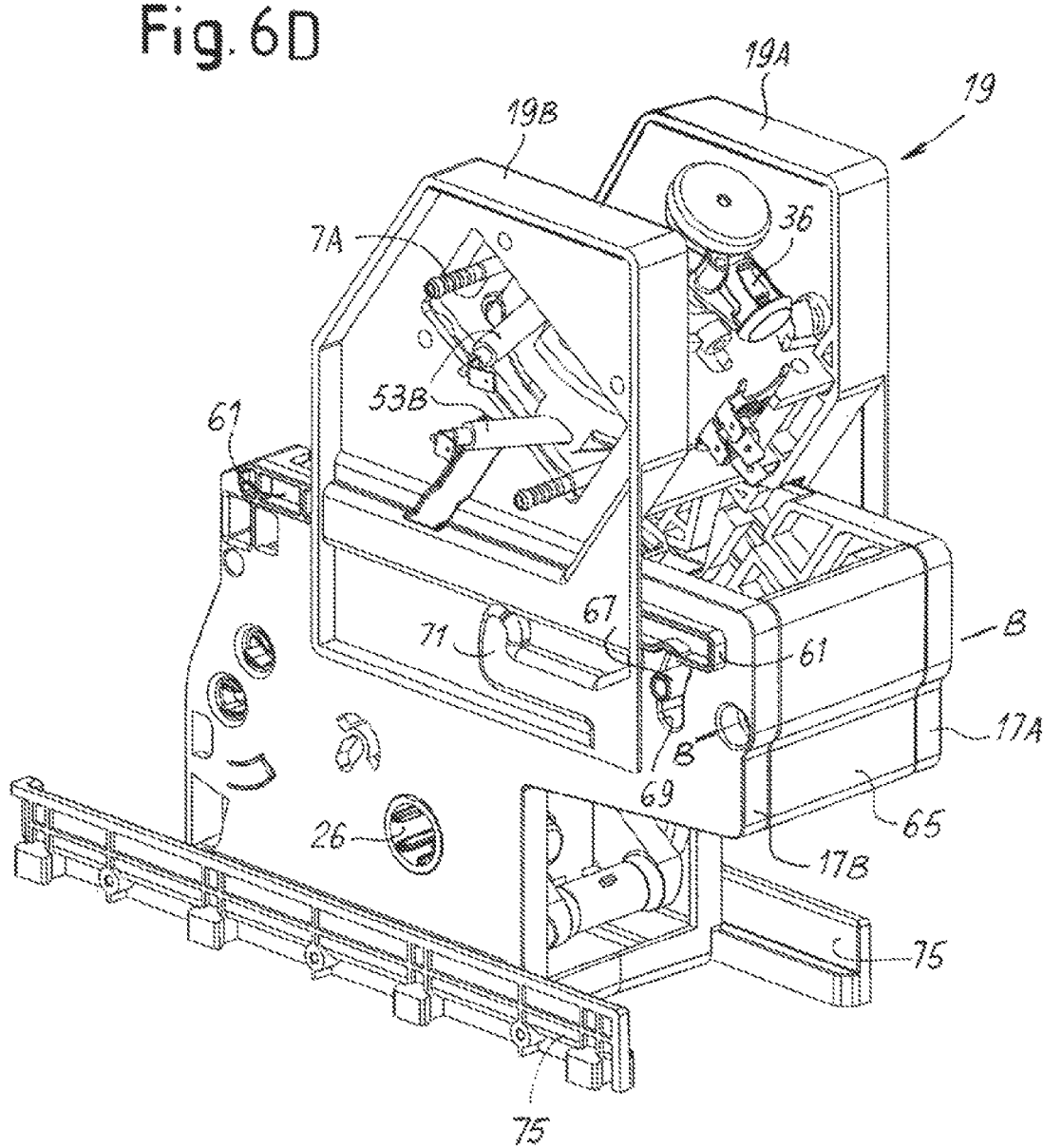

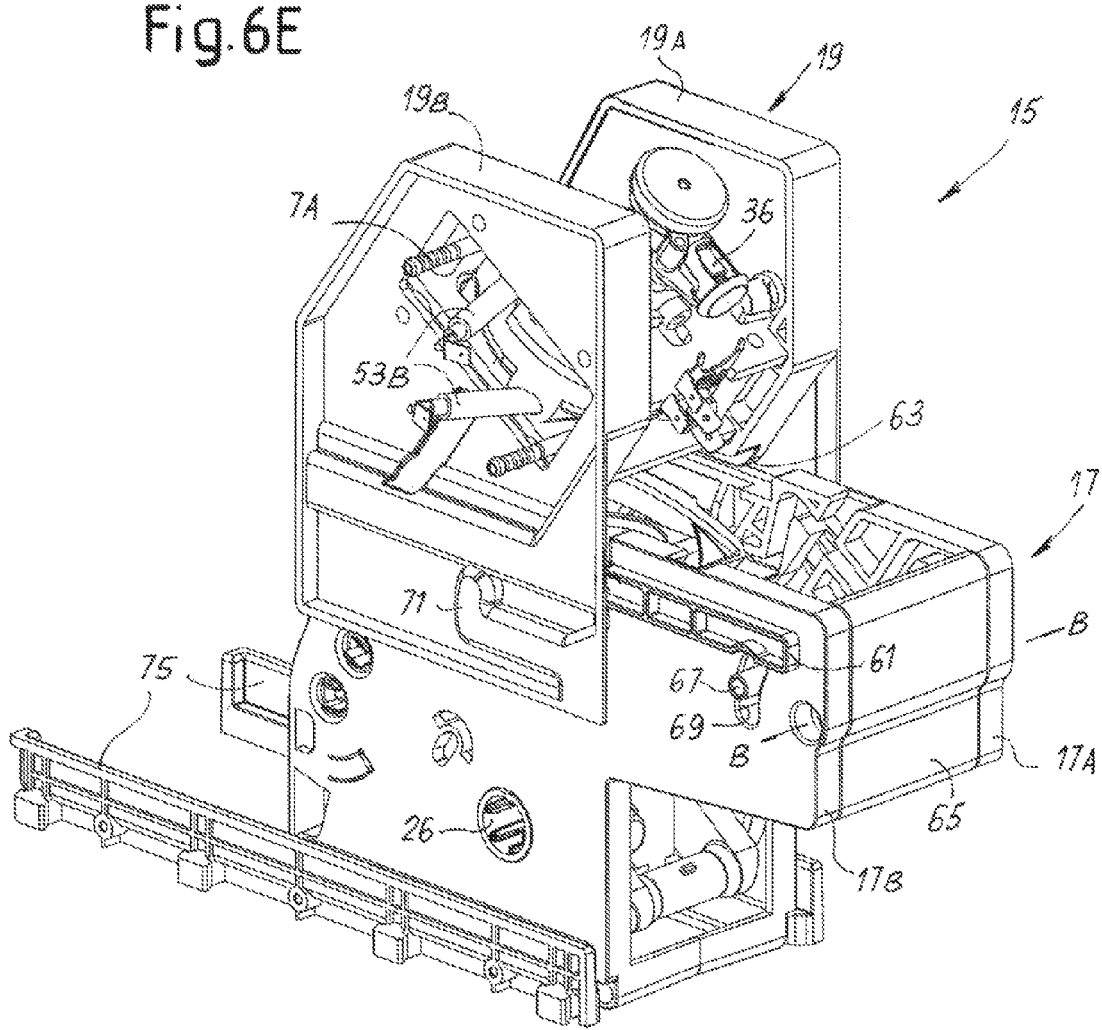

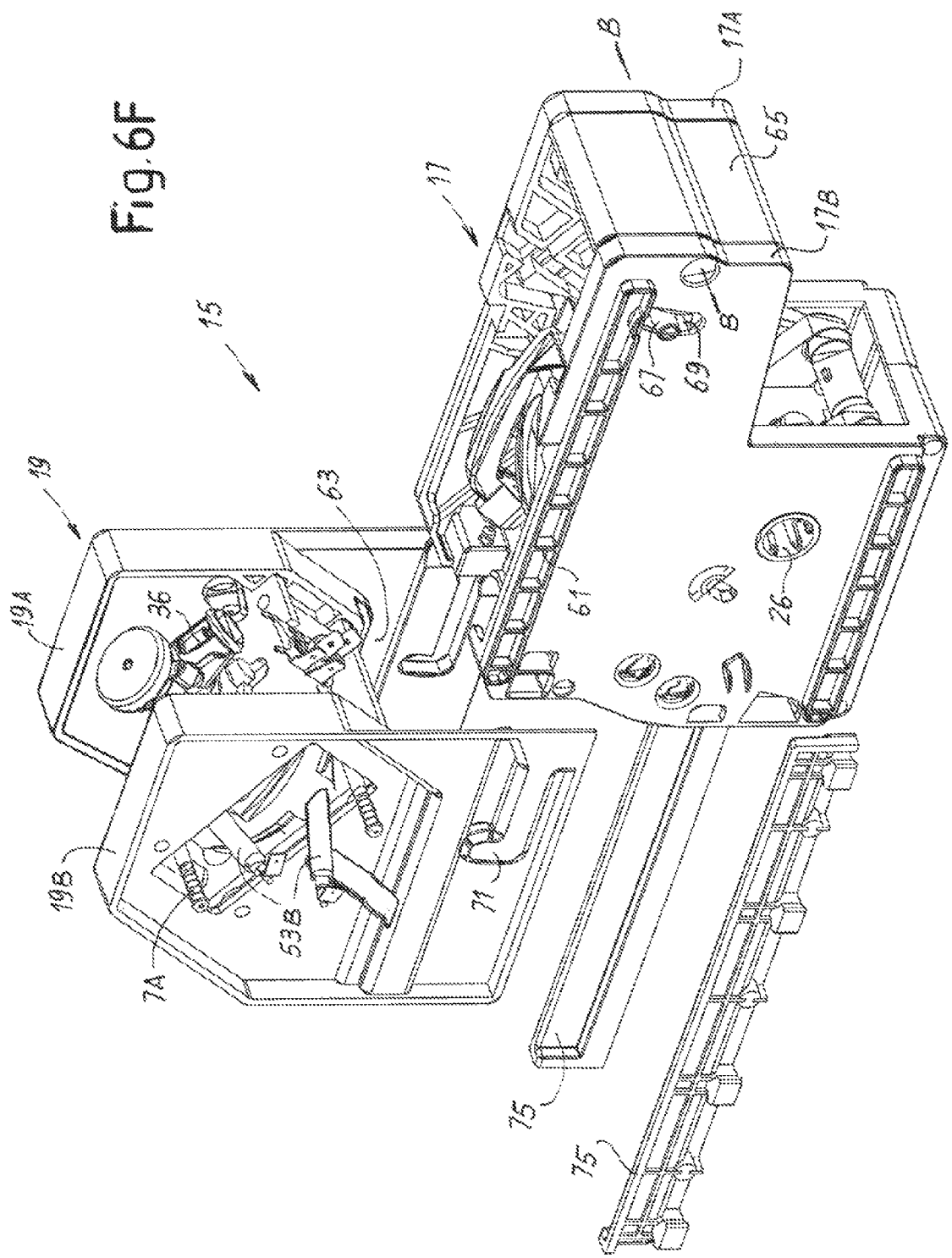

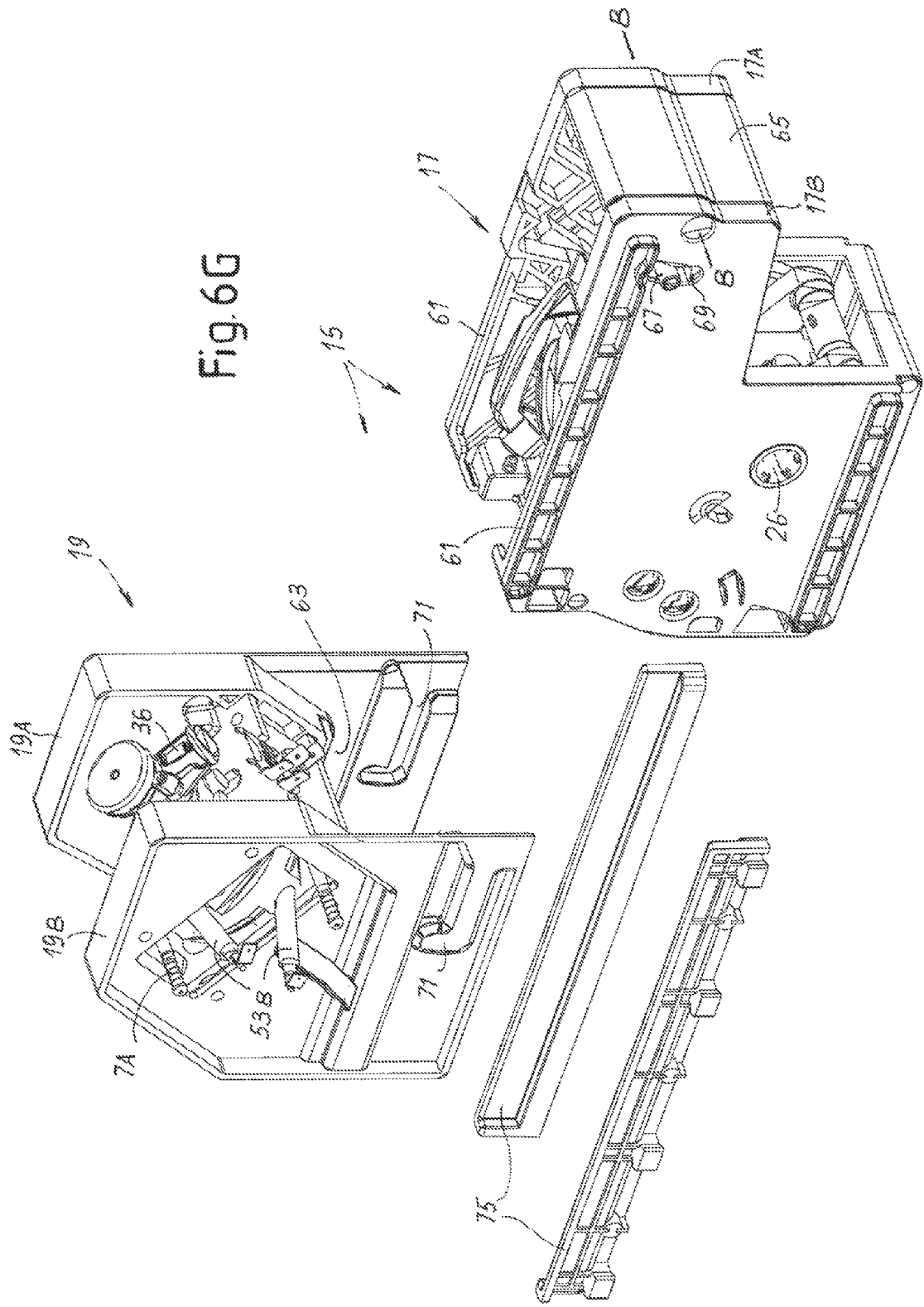

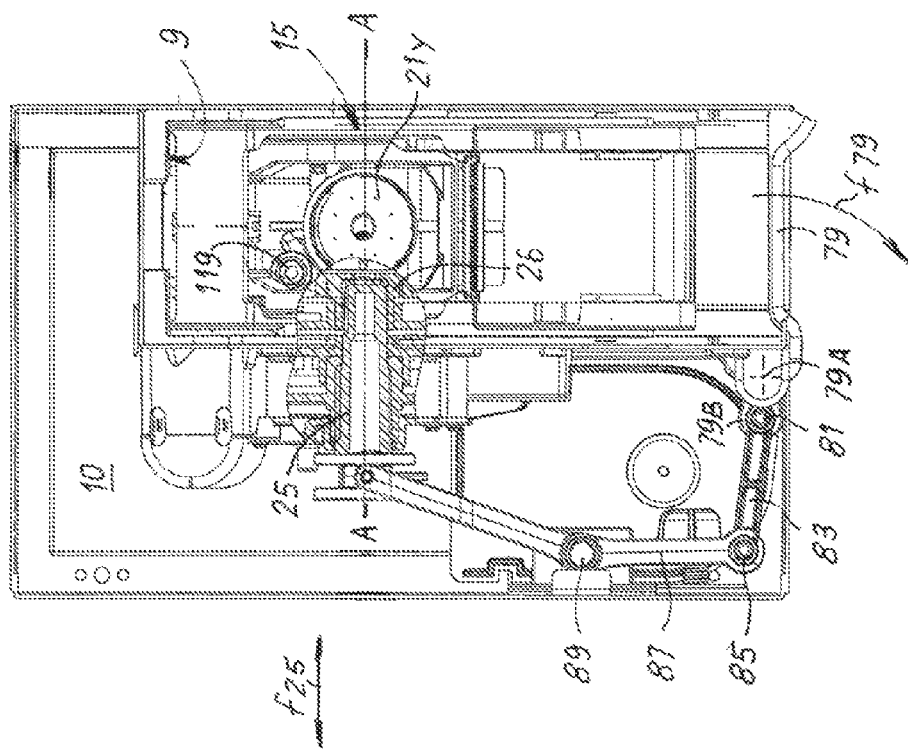
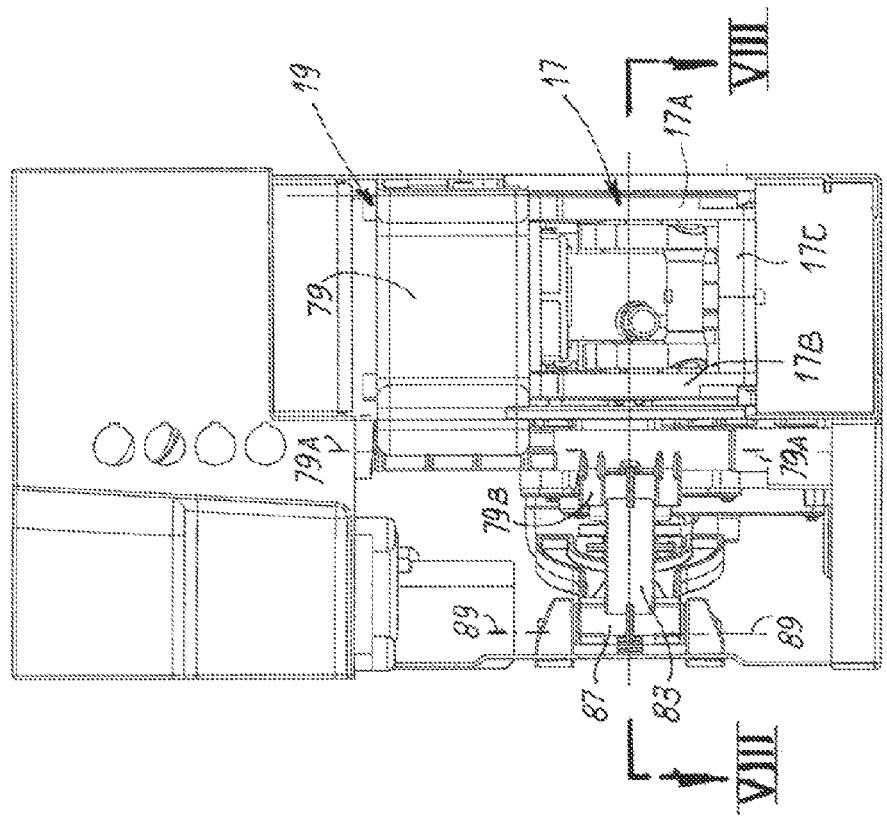

BREWING ASSEMBLY AND BEVERAGES PRODUCTION MACHINE COMPRISING SAID ASSEMBLY

TECHNICAL FIELD

The present invention relates to machines for producing hot beverages, for example coffee machines.

BACKGROUND OF THE INVENTION

Automatic or semiautomatic beverage machines for domestic or commercial use (vending machines) have a brewing assembly comprising two mutually mobile portions which open to receive a food product, for example coffee powder (loose or packaged in capsules or pods), and to adopt a closed position in which pressurised hot water is fed through the brewing chamber in order to extract aromas from the food product loaded therein and to produce the beverage.

These machines also have a boiler for production of the hot water, fed by a pump in order to achieve suitable brewing pressures.

EP 0931491 discloses a brewing assembly for a coffee machine of the type mentioned above, in which the boiler is formed in one piece with one of the portions of the brewing chamber so as to reduce thermal losses.

In brewing assemblies of this type, in particular which are intended for the production of espresso coffee, the water is fed at a relatively high pressure of approximately 8-15 bar. These high pressures generate high stresses in the brewing chamber and it is therefore necessary to provide a suitable support structure onto which the stresses can be unloaded during the brewing phase.

SUMMARY OF THE INVENTION

In accordance with one aspect, the invention provides a brewing assembly comprising a support structure and a brewing chamber comprising at least two mutually mobile portions for closing and opening a brewing volume, which brewing assembly is particularly efficient in terms of energy savings, mechanical robustness.

The invention is defined by the independent claims. The dependent claims define advantageous embodiments.

In accordance with one embodiment, the invention basically relates to a brewing assembly of the above-mentioned type for the production of hot beverages via extraction with pressurised hot water of a product loaded in a brewing chamber, in which brewing assembly: the support structure of the brewing chamber is subdivided into a first part which is fastened to a first portion of the brewing chamber, and a second part which is fastened to a second portion of the brewing chamber; the first part and the second part of the support structure can be mutually coupled and uncoupled; the first portion of the brewing chamber and the second portion of the brewing chamber are mobile to adopt an open position, and a closed position of the brewing chamber when the first part and the second part of the support structure are coupled; and the boiler is rigidly connected to one of said first and second parts of the support structure and to one of said first and second portions of the brewing chamber. It will be explained below how the second part of the support structure and the second portion of the brewing chamber are fastened to the boiler. This second part of the support structure and the respective second portion of the brewing chamber are housed in a substantially rigid manner in a machine housing, whereas the first part of the support structure and the first part of the brewing chamber can be taken out from the machine housing.

The boiler is therefore in thermal contact with the second part of the support structure of the brewing chamber and with the second part of the brewing chamber, in such a way that it is possible to maintain the temperature of at least one zone of the brewing chamber and therefore to supply a hotter beverage. Furthermore, the two parts of the support structure can be fastened and unfastened, making it possible to leave the boiler rigidly in the machine together with the second part of the support structure, whilst the first part of the support structure can be taken out with the respective first portion of the brewing chamber so as to be easily washed, or else so as to carry out other maintenance, replacement or component repair procedures.

In some advantageous embodiments of the invention the boiler surrounds a duct supplying the beverage from the brewing chamber. In further embodiments of the invention the boiler surrounds a duct feeding water from the boiler to the brewing chamber. In both cases there is a thermal advantage and in the first case there is also the advantage of a higher temperature of the beverage supplied.

The boiler is preferably a boiler of the instantaneous type. The heating resistor and the water duct are preferably housed in a module which is made of thermally conductive material and forms the body of the boiler. The resistor and the water duct preferably each form one or more coils inside said module. In preferred embodiments of the invention the coil or coils formed by the electric resistor surround the beverage supply duct. In this case the module forming the body of the boiler is advantageously hollow so as to allow the beverage duct to pass from the brewing chamber to a supplier assembly, or else to allow hot water to pass from the boiler to the brewing chamber.

In some embodiments the second part of the support structure houses the boiler, which is advantageously in thermal contact with the material forming the second part of the support structure, through which material passes the duct supplying the beverage from the brewing chamber or the duct feeding water from the boiler to the brewing chamber. A conductive heat exchange circuit is thus formed which comprises the wall of the beverage supply duct (or the water feed duct), the second part of the support structure and the body of the boiler.

The first part of the support structure and the second part of the support structure can be coupled together via reciprocal male and female coupling members. The reciprocal coupling members may comprise at least one pair of pins or projections and a pair of guides, into which said pins or projections are inserted when the first part of the support structure and the second part of the support structure are mutually coupled. The pins or projections are formed in one piece with one of said first and second parts of the support structure and the guides are formed in one piece with the other of said first and second parts of the support structure. For example, the pins or projections are formed in one piece with the first part, which can be taken out from the support structure, and the guides are formed in one piece with the second, fixed part of the support structure. A reverse arrangement is not excluded.

In some embodiments a mutual locking member of the two parts of the support structure may be provided, for example a resilient latching system comprising a pin and a latching seat. The pin can be carried by the first part of the support structure and, for example, can be connected to an unlocking lever. For example, the lever can be arranged between two sides of the first part of the support structure. In preferred embodiments of the invention a single lever may be provided which is articulated to the part of the support structure which can be taken out and is equipped with two opposed pins which cooperate with two opposed latching seats formed in the fixed part of the support structure.

In some embodiments the two parts of the support structure each comprise two opposed sides. The first portion of the brewing chamber may advantageously be arranged between the sides of the first part of the support structure. One of said sides may be equipped with a hole allowing a drive shaft to pass through, which drive shaft controls the opening and closing movement of the brewing chamber. The kinematic mechanisms for the transfer of motion from the drive shaft to the brewing chamber are advantageously arranged between the two sides of the first part of the support structure. The lever for unlocking the two parts of the support structure may also be articulated between the two sides of the first part of the support structure. The boiler may advantageously be arranged between the two opposed sides of the second part of the support structure.

In some embodiments projections are formed on the sides of the first part of the support structure and insert into guides formed in the sides of the second part of the support to mechanically couple the two parts of the support structure and to form a closed frame which internally houses the brewing chamber.

In accordance with preferred embodiments of the invention, the support structure and the system for mutual coupling of the first and second parts are formed in such a way that when the two parts of the support structure are coupled, they form a closed frame within which at least some of the stresses generated by the pressurised water fed into said brewing chamber are unloaded.

In accordance with some embodiments of the invention the first portion of the brewing chamber comprises a coupling to an actuator, for example an electric motor, for opening and closing which moves said first portion of the brewing chamber relative to the support structure. In some embodiments the first part of the support structure defines a loading position of the brewing chamber, in which the first portion of the brewing chamber is arranged beneath a loading opening for the product to be loaded in the brewing chamber. The first part of the support structure comprises guides for sliding the first portion of the brewing chamber in order to guide the approaching movement of the first portion of the brewing chamber towards the second portion of the brewing chamber fastened to the second part of the support structure.

In some embodiments the first portion of the brewing chamber comprises a substantially cylindrical, hollow body and a wall for closing said substantially cylindrical body; and the second portion of the brewing chamber comprises a piston for closing said substantially cylindrical body, said piston and said closing wall being mutually opposed when the brewing chamber is closed.

The closing wall of the brewing chamber may comprise through-holes for the feed of pressurised water and the piston may comprise holes to allow the passing through of the beverage extracted from the product loaded in the brewing chamber. In this case the duct supplying the beverage from the brewing chamber is preferably in fluid connection with said piston and can extend through a shank of the piston itself, formed in one piece with the second part of the support structure. In further embodiments a reverse arrangement of the feed of pressurised hot water to the brewing chamber and of supply of the beverage from the brewing chamber may be provided.

For periodic cleaning, the piston forming part of the second portion of the brewing chamber may be removable from the second part of the support structure in order to be washed or replaced. For this purpose the piston can be coupled, for example, to a bayonet system on its shank which, conversely, can remain rigidly coupled to the support structure.

In some embodiments the boiler comprises a hot water outlet and a connector which is connectable to the duct feeding water to the brewing chamber, said connector being connected to the duct feeding water to the brewing chamber when the brewing chamber is in the closed position.

In some embodiments the first portion of the brewing chamber moves in rotation and in translation in order to open and close the brewing chamber. In this case the connector can advantageously be connected to the hot water feed duct via a movement in translation of the first portion of the brewing chamber, as a result of which said first portion of the brewing chamber approaches the second portion of the brewing chamber.

The invention also relates to a machine for the production of hot beverages, for example coffee, comprising a housing into which a brewing assembly as described above is inserted and in which the first part of the support structure can be taken out from said housing together with said first portion of the brewing chamber whilst keeping said second part of the support structure, said boiler and said second portion of the brewing chamber in said housing. Such a machine provides for a brewing assembly that is energy efficient, mechanically robust and moreover easy to clean.

Further advantageous features and embodiments of the brewing assembly and of the machine according to the invention are described hereinafter with reference to the accompanying drawings and in the accompanying claims which form an integral part of the present description.

BRIEF DESCRIPTION OF THE DRAWINGS

The invention will be better understood upon reading the following description with reference to the drawings, which show a non-limiting embodiment of the invention and in which, more specifically:

FIGS. 2A and 2B are side views, partly in section, of the brewing assembly inserted into the housing of the machine and with the brewing chamber open;

FIGS. 3A and 3B are side views, partly in section, similar to FIGS. 2A and 2B in a closing phase of the brewing chamber;

FIGS. 4A and 4B are views similar to those of FIGS. 3A and 3B in a rinsing phase of the brewing chamber;

FIGS. 5A and 5B are views similar to those of FIGS. 3A and 3B in a brewing position with a different volume of the brewing chamber;

FIGS. 6A-6G show a sequence, in 3-D, of the mutual unfastening procedures of the two parts of the structure of the brewing assembly;

FIG. 7 is a front view of the brewing assembly inserted into its seat in the machine;

FIG. 8 is a section along VIII-VIII of FIG. 7;

DETAILED DESCRIPTION OF AN EMBODIMENT OF THE INVENTION

Reference will be made hereinafter to an embodiment which is specifically intended for the production of beverages based on coffee, for example espresso coffee. However, it should be understood that the invention can also be applied to machines for the production of other beverages or food products via the passing of pressurised hot water through a brewing chamber in which the ingredients (loose or packaged) are provided for the production of the beverage or other food product.

Figure 1:
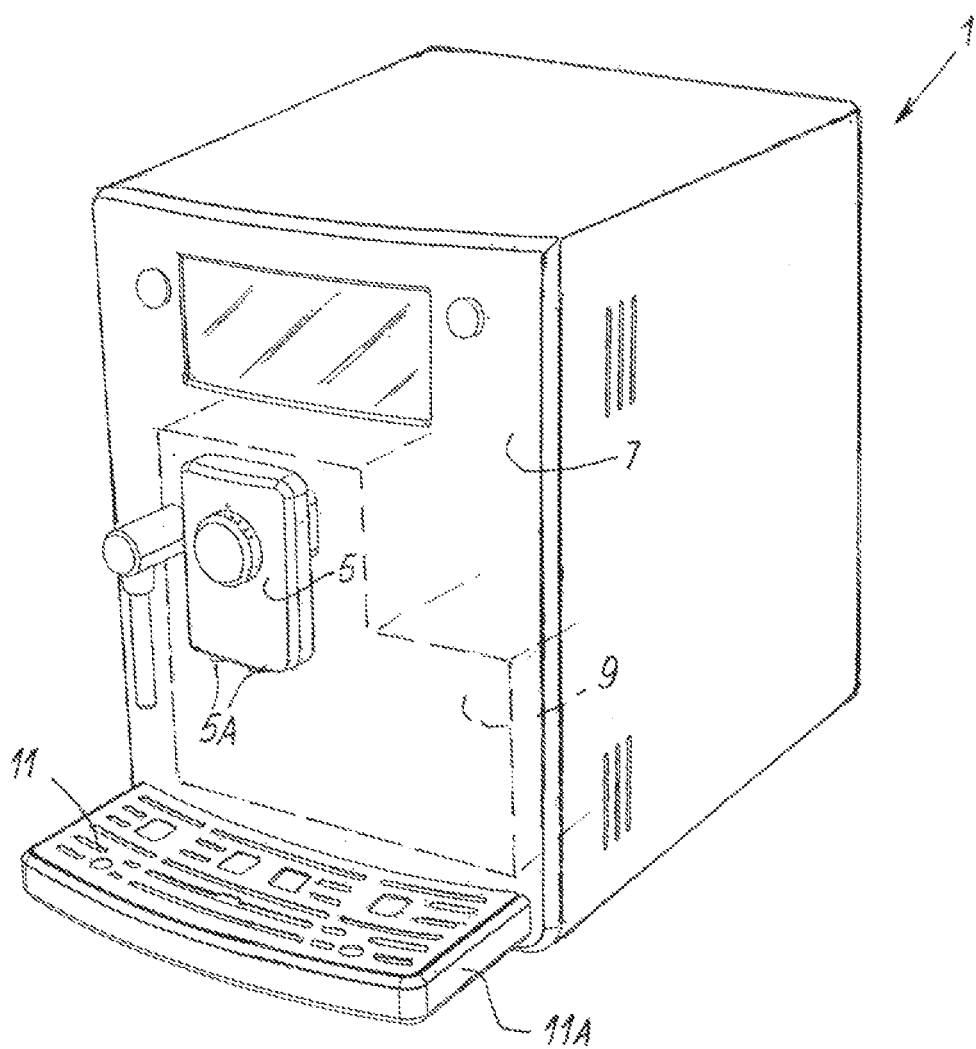
FIG. 1 is an overall view of a coffee machine into which the assembly according to the invention is inserted.

FIG. 1 shows an entire coffee machine 1 in which the present invention can be incorporated. The machine 1 comprises a body 3 on the front part of which a coffee supplier 5 is arranged. In some embodiments the supplier 5 is mounted on a door 7 which closes the front part of the machine, in the interior of which is arranged a housing, indicated with dashed lines by 9, for a brewing assembly described in greater detail hereinafter.

The coffee supplier 5 may have one or preferably two supply nozzles 5A arranged side by side. Beneath the supplier 5 is arranged a support grill 11 for the cups in which the coffee supplied from the supplier 5 is to be collected. The grill closes a tray 11A therebeneath for collecting any spillages. The structure of the machine described thus far is known on the whole, just as the internal components of such machines are known to the person skilled in the art, such as water and coffee tanks, the pump, the hydraulic circuits, the probable coffee machine, and the control electronics. These components will therefore not be described further here. The present invention specifically relates to the brewing assembly and the boiler for heating the water, and these elements will be described in detail hereinafter with reference to FIGS. 2A to 12, which illustrate the features of the brewing assembly which is the subject of the present invention.

The brewing assembly, denoted as a whole by 15, comprises a support structure which is subdivided into two parts which can be coupled or separated by a sequence of movements shown in FIGS. 6A to 6G and described below in greater detail. Conversely, FIGS. 2A-5B show the operation of the brewing assembly 15 during the brewing or washing cycles, with the two parts of the support structure coupled to form a closed frame supporting the brewing chamber.

More specifically, the support structure comprises a first part 17 which can be removed from the housing 9 of the machine, and a second part 19 which is normally fixed inside the housing 9 of the machine. The possibility of removing the part 17 of the support structure makes it possible to clean this part and the elements fastened thereto, possibly even in dishwashers. 'Removable' means a part of the support structure which can be easily taken out or removed directly by the user, preferably manually without the use of equipment or tools.

In some embodiments the first part 17 of the support structure comprises two sides 17A and 17B which are interconnected by crossbars 17C, 17D, 17E, 17F. A first portion, denoted as a whole by 21, of a brewing chamber is housed between the sides 17A and 17B, the second portion of which brewing chamber, denoted by 23, is fastened to the second part 19 of the support structure.

The second part 19 of the support structure comprises two sides 19A, 19B (see FIG. 6A in particular) which can be fixed inside the housing 9 of the machine 1.

The first portion 21 of the brewing chamber moves via roto-translation controlled by an electric motor. More specifically, the portion 21 of the brewing chamber rotates about an axis A-A by means of a drive shaft 25 (see FIGS. 7-10 in particular) which moves in an engaging and disengaging manner described hereinafter in greater detail and for purposes explained below in order to enter a drive 26 of a kinematic mechanism for actuation of the brewing chamber.

Figure 10:
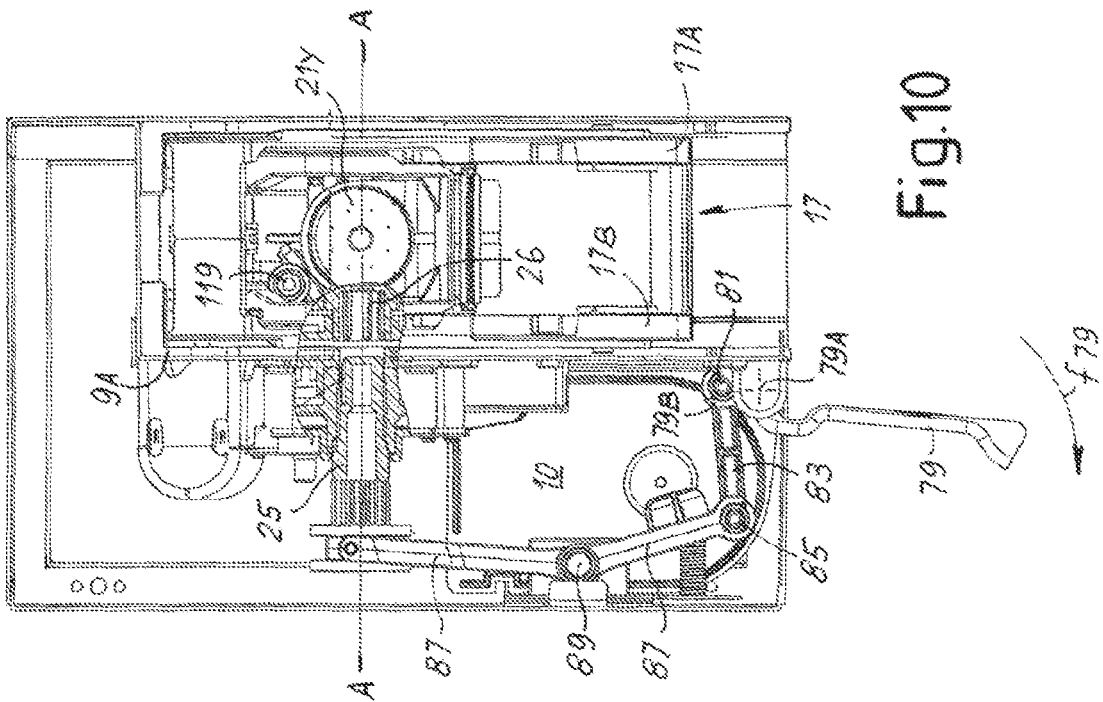
FIG. 10 is a section along X-X of FIG. 9.

The coupling between the shaft 25 and the drive 26 can be achieved with a grooved profile, as can be seen in particular in FIGS. 8 and 10.

The portion 21 of the brewing chamber also moves in translation in a direction f21 (FIGS. 2A, 2B), guided along guides 27 formed in the inner faces of the sides 17A, 17B of the first part 17 of the support structure. This combined roto-translation movement allows the mobile portion 21 of the brewing chamber to adopt a first position (FIGS. 2A and 2B), in which the product, for example powdered coffee or coffee in capsules, for the production of the beverage is loaded in the mobile portion 21 of the brewing chamber, and at least a second position (FIGS. 3A, 3B, 5A, 5B) in which the two portions 21 and 23 of the brewing chamber are coupled to one another so as to make it possible to close a brewing volume and allow pressurised hot water to pass through the product contained in the brewing chamber, and to therefore extract from it the ingredients for the production of the beverage.

In the example illustrated the first portion 21 of the brewing chamber comprises a body 21X with a substantially cylindrical cavity which is closed at the base by a closing wall formed by a mobile piston 21Y. In one possible embodiment the piston 21Y has holes for the inlet of pressurised hot water fed along a duct formed, at least in part, in the shank 21Z of the piston 21Y.

The second portion 23 of the brewing chamber comprises a piston 31 equipped with a seal 33 and a front plate 35 with a plurality of holes for allowing the discharge of the beverage extracted from the product contained in the brewing chamber. The holes in the plate 35 are in fluid connection with a beverage supply duct 37 which ends in a connector 38 for connection to the supplier 5 mounted on the door 7.

The piston 31 is resiliently biased by a spring 39 for adapting the volume of the brewing chamber to the amount of coffee powder or to the number of pre-packaged capsules or pods inserted into the brewing chamber. A second piston 41, which is coaxial with the piston 31 and pulled back therefrom, defines a further element for closing the brewing chamber during the supply cycle.

In some embodiments the mobile piston 31 is equipped with a shank 31A which slides in a through-seat formed in the second piston 41. Said second piston is fixed to the second part 19 of the support structure and may be formed in one piece with the main body of the second part 19 of the support structure. The supply duct 37 is advantageously formed, at least in part, in the shank 31A of the piston 31.

A boiler 51 for heating the water is connected to the second part 19 of the support structure of the brewing chamber. The boiler 51 is advantageously in contact with the part 19 of the support structure and can heat said part 19 of the support structure by conduction.

The boiler 51 preferably does not have a collection tank, but instead is of the instantaneous type, that is to say it has a high-power electrical resistor which heats a relatively small volume of water so the water is brought to temperature from the moment it flows through the boiler to be supplied through the brewing assembly. Boilers of this type are known per se and generally have an electrical resistor 53 wound in a spiral about an axis and inside a module 55 made of thermally conductive material forming the body of the boiler. Arranged inside the module 55 is a duct 57 which is also wound in a spiral and into which the water flows, said water being heated by the heat dissipated from the electrical resistor 53 and transferred to the water via the conductive material forming the module 55 and the wall of the duct 57.

In some embodiments the boiler 51 surrounds at least part of the portion 23 of the brewing chamber. In the example shown the boiler 51 surrounds the shank 31A of the piston 31, in which the beverage supply duct 37 is formed. The temperature of the beverage supply duct 37 is thus maintained by the heat generated by the boiler 51.

Furthermore, the mechanical contact between the second part 19 of the support structure of the brewing chamber and the module 55 forming the body of the boiler 51 makes it possible to maintain the temperature also of the second portion of the brewing chamber 23 and, in particular, of the piston 31 so the beverage produced and supplied is discharged at a temperature which, on the whole, is higher than that provided by conventional systems in which the boiler is arranged at a distance from or, in any case, so as not to be in contact with the brewing chamber.

Figure 11:
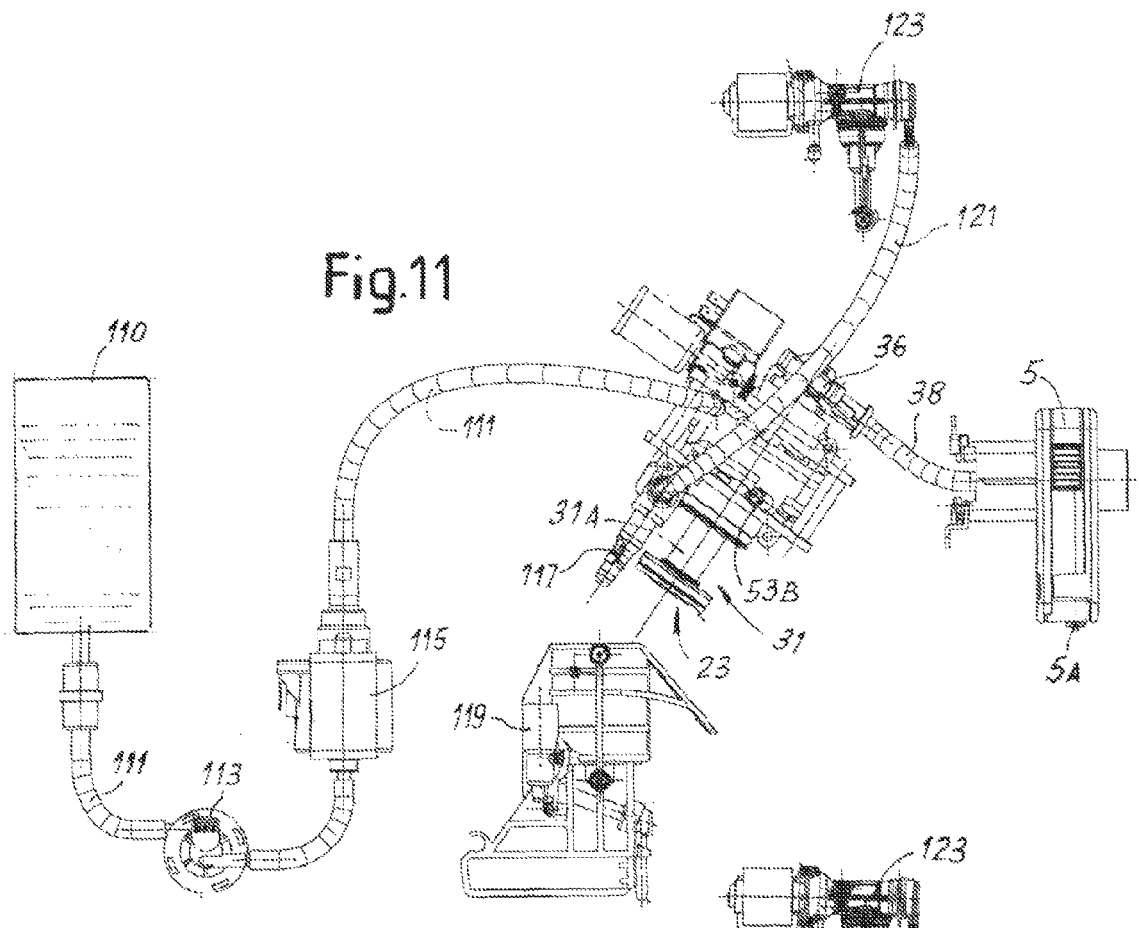
FIGS. 11 and 12 are schematic views of two separate embodiments of the hydraulic circuit feeding the water and supplying the beverage from the brewing assembly.

FIG. 11 shows in greater detail, and in one possible embodiment, the components of the hydraulic circuit with the boiler 51 and the portions 21, 23 of the brewing chamber. For greater clarity the details of the support structure have been omitted in this figure. The boiler 51 is connected to the water tank (indicated schematically in this instance by 110) via a duct 111, along which a flowmeter 113 and a pump 115 are arranged. The outlet of the boiler is connected to a first connector 117 which is formed in one piece with the portion 23 of the brewing chamber and which engages in a second connector 119 formed in one piece with the first portion 21 of the brewing chamber during the closing movement of the brewing chamber so as to feed the water pressurised by the pump 115 and heated by the boiler 51 into the duct 21Z and from there into the brewing chamber. Reference numeral 121 denotes a duct for relieving the pressure at the end of the brewing cycle and reference numeral 123 denotes a valve which is controlled electronically to manage, in a manner known per se, the brewing cycle and the washing cycle of the brewing chamber. The drawing of FIG. 11 also shows the duct 38 which connects the outlet of the brewing assembly to the supplier 5. A counter-pressure valve 36, which is preferably adjustable and makes it possible to modify the brewing pressure, is arranged between the brewing chamber and the duct 38. Valves of this type are known per se and the valve 36 will therefore not be described in greater detail.

Figure 12:
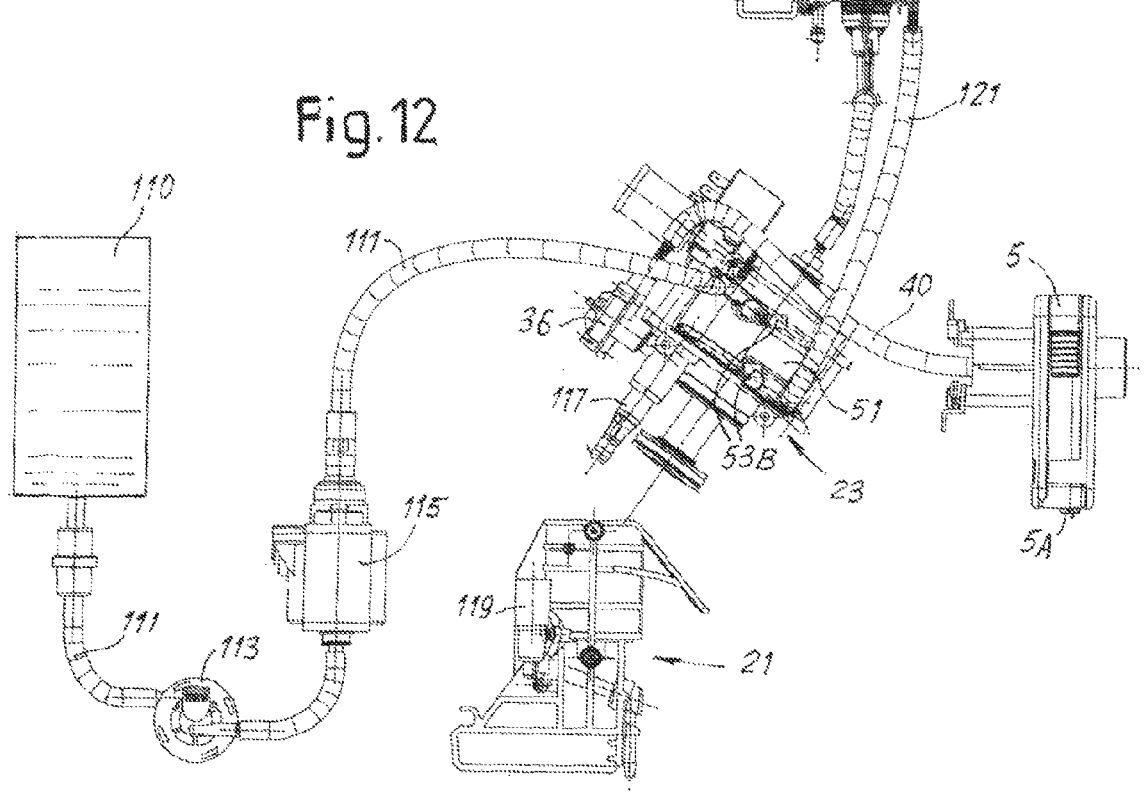

FIG. 12 schematically shows a modified embodiment of the hydraulic circuit of the brewing assembly 15. Like reference numerals denote like parts or parts which are equivalent to those in FIG. 11. In this embodiment the hot water emerging from the boiler 51 is fed through the duct 37 into the brewing chamber from above rather than from below. The beverage discharges from the perforated plate defining the upper face of the piston 21Y closing the brewing chamber from below and flows into the duct 21Z formed in the shank of the piston 21. From here, via the connection formed by the coupling of the connectors 117 and 119, the beverage flows through the counter-pressure valve 36, which in this case is connected to the connector 117. From the counter-pressure valve 36, the beverage is fed through the duct, denoted by 40, connecting to the supplier 5. In short, in the embodiment of FIG. 12 the pressurised hot water is fed from above and the beverage is supplied from the base of the brewing chamber with a device which is the reverse of that in FIG. 11, where the pressurised hot water is instead fed from below and the beverage is supplied from the top of the brewing chamber.

The boiler 51 must be connected to other components inside the machine, in particular by the hydraulic circuit for feeding water comprising the pump and the tank inside the machine (FIG. 11 or 12).

FIGS. 11, 12 and 6A-6G show the two electrical terminals 53B via which the electrical resistor 53 of the boiler 51 is connected to the electric feed (not shown). Reference numeral 57A denotes the connector connecting the duct 57 for water inside the boiler 51 to the feed duct 111 from the pump 115 (FIGS. 11 and 12). Furthermore, the boiler normally has a temperature sensor connected to a programmable electronics control unit as well as one or more safety fuses which are not shown, but are known per se.

As a result of these connections the boiler 51 should preferably remain fastened rigidly inside the housing 9 of the machine 1 and cannot be removed by the user. On the other hand, it must be possible for the user to wash the brewing assembly from time to time, For this purpose the first part 17 of the support structure of the brewing chamber, inside which the first portion 21 of the brewing chamber is movably housed, can be taken out from the housing 9 and easily detached from the second part 19 of the support structure.

Members for reversible mechanical coupling between the parts 17 and 19 are provided in order to allow reciprocal coupling and detachment of the two parts 17 and 19 of the support structure of the brewing chamber.

One embodiment of the mechanical coupling between the two parts 17 and 19 of the support structure is shown in particular in FIGS. 6A-6G.

In the embodiment shown each side 17A, 17B carries a projection 61 on its outer face. Each projection 61 slidingly inserts into a corresponding guide or channel 63 which is formed in one piece with the part 19 of the support structure of the brewing assembly, which is in turn formed in one piece with the machine 1. More specifically, the guides or channels 63 are formed in the inner faces of the two sides 19A, 19B. The coupling between the two projections 61 and the two guides or channels 63 provides a mechanical fastening between the two parts 17 and 19 of the brewing chamber, which fastening is able to withstand the forces transferred onto the structure 17, 19 when pressurised water is fed to the interior of the brewing chamber for the preparation of the beverage.

A reversible latching system may be provided in order to lock the mobile part 17 to the fixed part 19 of the bearing structure. In the embodiment shown the mobile part 17 comprises a lever 65 which is disposed and articulated between the two sides 17A, 17B, which are arranged side by side, about a substantially horizontal axis B-B. The lever 65 is formed in one piece with two opposed pins 67 which are substantially parallel to the axis B-B. The pins 67 project towards the outside of the sides 17A, 17B through curved slots 69 and engage in respective seats 71 formed in the sides 17A, 17B. The lever 65 is advantageously resiliently biased, for example by a spring which is coaxial with the axis of rotation B-B, towards the position of engagement of the pins 67 in the seats 71.

The sequence of FIGS. 6A-6G shows the movement for removing the part 17 from the part 19. The movement is made possible by rotating the lever 65, in the direction of the arrow f65, with subsequent release of the pins 67 from the seats 71. Reference numeral fl7 denotes the direction of movement in order to remove the part 17 from the fixed part 19. The reverse movement from the position of FIG. 6G to the position of FIG. 6A makes it possible to mutually couple the two parts 17 and 19. In this case the lever 65 does not require actuation since an engaging profiled part 71A connected to each seat 71 cooperates with the respective pin 67, thus rotating the lever 65 against the force of the spring.

It should be understood that the mechanical connection between the two parts 17, 19 of the support structure of the brewing assembly may also be produced by other suitable mechanisms, for example by providing alignable coupling holes in each of the two parts 17, 19, inside which holes locking pins or pegs which are separate from the support structure can be inserted. On the other hand, the embodiment shown is preferred since it avoids the use of separate components which the user has to handle and which may be lost. The arrangement of the guides and of the projections can be reversed, with guides on the part 17 of the support structure and projections on the part 19 of the support structure. Furthermore, the form of the projections and of the guides may be different from those illustrated.

As can be understood easily from the sequence of FIGS. 6A-6G, the parts 17 and 19 of the support structure of the brewing chamber are coupled and uncoupled in a simple manner by a reciprocal movement in the horizontal direction which makes it possible to insert and remove the projections 61 into and from the guides 63. When the brewing assembly is fully assembled inside the housing 9 of the machine 1, the two parts 17, 19 of the support structure of the brewing chamber are coupled at the projections 61 which are arranged in the guides 63. The coupling is such that the two connected parts 17 and 19 define a closed frame, inside which the stresses generated by the pressure of the water inside the brewing chamber during the brewing cycle can be unloaded. This pressure may reach high levels, for example of approximately 10-15 bar and the reaction forces on the fastenings which support the portions 37, 21 of the brewing chamber are thus considerable. With the configuration described, a substantial amount of the reaction forces caused by the pressure of the water remains confined within the support structure and is not unloaded onto the machine.

Inside the housing 9 of the machine is provided a sliding and guiding plane defined by profiled guide parts 75, along which plane the first part 17 of the support structure slides so as to be inserted into the machine and removed therefrom. The second part 19 of the support structure is permanently fixed inside the housing 9 of the machine above the plane defined by the profiled parts 75.

In order to facilitate cleaning of the second portion of the brewing chamber without removing the second part 19 of the support structure, it is possible for the piston 31 or part thereof to be removably fixed to the support structure, for example by a bayonet mechanism, so as to be easily detachable by the user in order to clean the perforated plate 35.

As is shown in particular in FIGS. 7 to 10, a substantially vertical wall 9A which separates the compartment 9 from a compartment 10, in which the electric motor means is housed which actuates the brewing chamber and connects to the assembly itself by means of the shaft 25, is provided beside the compartment 9 in which the fixed part 19 of the support structure is housed and in which the profiled parts 75 for insertion of the mobile part 17 of the support structure of the brewing chamber are positioned. See FIGS. 7 to 10 in particular.

The drive shaft 25 can be moved in the direction of the arrow f25 via a lever 79A which is articulated at 79A to the wall 9A of the compartment 9. The lever 79 has an appendage 79B which is articulated at 81 to a first end of a connecting rod 83. The second end of the connecting rod 83 is articulated at 85 to a double lever 87 which is articulated at 89 to a wall 10A defining the compartment 10. The double lever 87 is fastened at one end to the connecting rod 83 and at the opposite end to the shaft 25. The rotation of the lever 79 about the axis 79A subsequently rotates the double lever 87 and this, in turn, moves the shaft 25 in translation, in the direction of the arrow f25, parallel to its own shank.

FIGS. 7 and 8 show the position in which the shaft 25 is engaged with the drive 26 of the brewing chamber. In this position the lever 79 is arranged in front of the removable part 17 of the structure carrying the brewing assembly 15. The part 17 of the structure on which the removable part of the brewing assembly 15 is mounted thus cannot be removed from the compartment 19. In order to remove the part 17 of the bearing structure and therefore the relative portion of the brewing assembly 15 integrated into this part of the structure, the user must first rotate the lever 79 through approximately 90° in the direction of the arrow f79, thus bringing it from the position of FIGS. 7 and 8 into the position of FIGS. 9 and 10. This rotation makes accessible the part 17 of the structure carrying the brewing assembly 15 and at the same time causes the shaft 25 to be retracted from the drive 26, as can be seen by comparing FIGS. 8 and 10.

Figure 9:
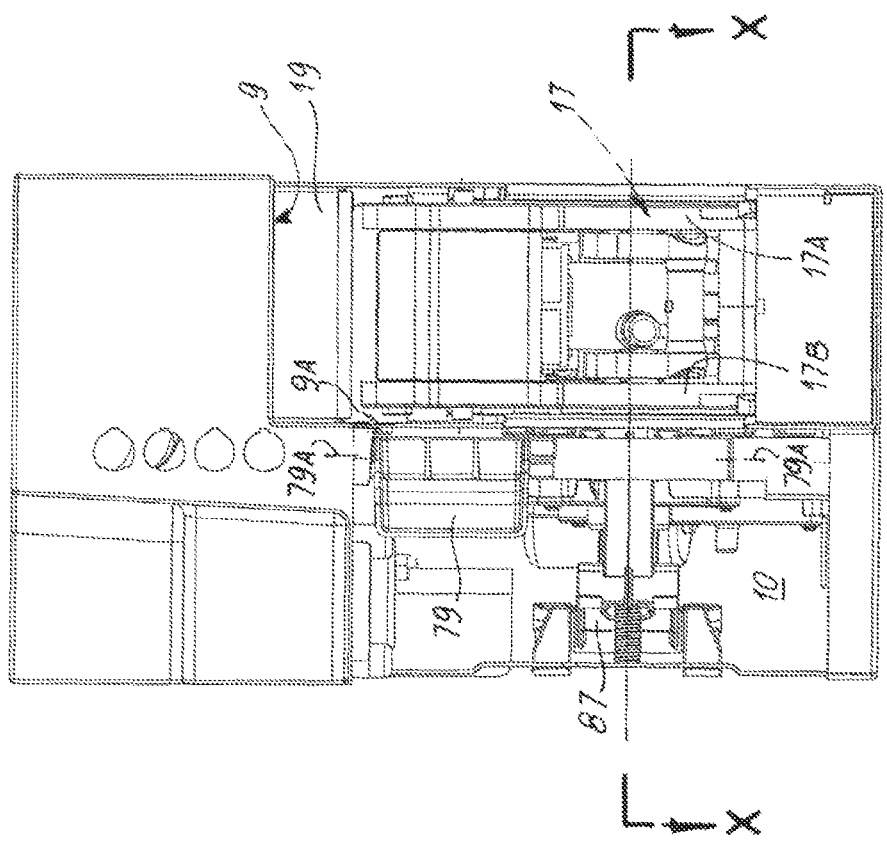
FIG. 9 is a view similar to that of FIG. 7 with the brewing assembly pre-arranged so as to be removed from its seat.

Once the position shown in FIGS. 9 and 10 has been reached, the user can remove the part 17 of the support structure of the brewing assembly 15 from the compartment 9 and then re-insert it into the compartment 9, for example after cleaning it or lubricating the moving parts of the brewing chamber mounted on the part 17 of the support structure. Rotation of the lever 79 in the opposite direction couples the shaft 25 to the drive 26.

FIGS. 2A, 2B, 3A, 3B, 4A, 4B and 5A, 5B show four different positions adopted by the brewing assembly 15 in order to load coffee into the brewing chamber, during a supply cycle, and during a washing or decalcification cycle. These figures show further characteristic elements of the brewing assembly which could be also used in a conventional brewing assembly, of which the support structure is not subdivided into two parts but instead is formed conventionally in a single module. FIGS. 2A, 3A, 4A and 5A show the brewing assembly sectioned along a median vertical plane, that is to say substantially parallel to the sides 17A, 17B and 19A, 19B. FIGS. 2B, 3B, 4B and 5B show a side view of the components of the brewing chamber and of the other components housed between the sides 17A, 17B and 19A, 19B. The sides 17A, 19A have been removed in order to show said components.

FIGS. 2A and 2B show the brewing assembly 15 in the open position, in which it is pre-arranged to receive a coffee powder load, for example.

In FIGS. 2A and 2B the lower portion 21 of the brewing chamber is arranged in an approximately vertical position with the opening facing upwards beneath a fixed loading hopper 21A.

Apart from the components described thus far of the brewing chamber and of the boiler, two scrapers 101, 103 can also be seen in the drawings for cleaning the surface of the piston 21Y which closes the portion 21 of the brewing chamber from below, and for cleaning the surface of the perforated plate 35 which is formed in one piece with the piston 31 of the upper portion 23 of the brewing chamber.

The first scraper 101 is carried by oscillating arms 101B which are articulated at 101A to the part 17 of the bearing structure. A compression spring 102 biases the arm 101B and the scraper 101 in the idle position of FIGS. 2A, 2B. The second scraper 103, which can be seen in particular in FIG. 2A, is carried by a pair of oscillating arms 103B which are articulated at 103A to the first portion 21 of the brewing chamber. A compression spring 104 holds the scraper 103 and the oscillating arms 103B in the position shown in FIG. 2B. Pins 103C which engage in shaped channels 105 formed in the inner faces of the sides 17A and 17B are provided on the outside of the oscillating arms 103B. Merely the shaped channel 105 formed in the side 17B can be seen in FIGS. 2A and 2B.

As will be clarified with reference to the subsequent FIGS. 3A-5B, the shaped channels 105 have cam-like profiles for the pins 103C to impart motion to the scraper 103 during the opening phase of the brewing chamber so the lower face of the plate 35 is scraped by the scraper 103 and any residues of the products (coffee powder) used to produce the beverage are removed from said plate.

In a view and section similar to FIGS. 2A, 2B, FIGS. 3A, 3B show the brewing assembly in a closed position and with a volume of the brewing chamber corresponding to a limited amount of product, for example to supply a single espresso coffee. The position shown in FIGS. 3A, 3B has been obtained by rotating, via the shaft 25, the portion 21 of the brewing chamber in the direction of the arrow f21. The rotation has brought the first portion 21 of the brewing chamber into alignment with the second portion 23 of the brewing chamber. In addition to the rotation in the direction of the arrow f21, the portion 21 of the brewing chamber has also moved in translation in the direction of the arrow f21' so the piston 31 and the piston 41 of the second portion of the brewing chamber 23 penetrate the cylindrical cavity 21X of the first portion 21 of the brewing chamber in order to close the brewing chamber. The combined movement of rotation and translation is obtained by transferring the motion of rotation of the shaft 25 and of the drive 26 to the mobile portion 21 of the brewing chamber via a pair of arms 28 rotating about the axis of the shaft 25 and of the drive 26 and equipped with pins 28A engaging in grooves 28B formed in one piece with the mobile portion 21 of the brewing chamber. As can be seen by comparing FIGS. 2B and 3B for example, the rotation of the arms 28 (only one of which can be seen in these figures, the other being symmetrical about a vertical plane parallel to the plane of the figure) causes the roto-translation of the portion 21 of the brewing chamber.

When the brewing chamber has reached the closed position of FIGS. 3A and 3B, pressurised hot water can be fed through it from the boiler in order to discharge the beverage.

Once the brewing cycle has finished the brewing chamber is opened by a roto-translation movement, which is the reverse of the closing movement, by rotation of the shaft 25 and of the drive 26. In a manner known per se, a lever 32 which is articulated to the mobile portion 21 of the brewing chamber cooperating with the fixed support structure causes the piston 21Y, during the opening movement of the brewing chamber, to slide towards the mouth of the cavity 21X in the mobile portion 21 of the brewing chamber so the upper face of the piston 21Y is scraped by the scraper 101. Only after the opening rotation is the piston 21X in the lower position of FIG. 2A.

During the roto-translation movement of the brewing chamber the mobile portion 21 of the brewing chamber drags the pair of arms 103B which carry the scraper 103. During this movement the pins 103C slide in the shaped channels 105. The shape of these channels is determined as a function of the path of the mobile portion 21 of the brewing chamber and as a function of the shape of the arms 103B, in such a way that the scraper 103 follows a path substantially parallel to the surface of the perforated plate 35, sliding thereover and removing therefrom any debris or residues of the product contained in the brewing chamber.

In a view and section similar to FIGS. 2A, 2B, FIGS. 4A, 4B show the brewing assembly in a washing position. The brewing chamber is empty and its volume is close to zero. Hot water is passed through the hydraulic circuit in order to wash or decalcify the machine.

FIGS. 5A, 5B show a view and section of the same brewing assembly in a beverage supply position with a greater amount of product in the brewing chamber. In this case the volume of said brewing chamber is substantially greater than the volume assumed in the position of FIGS. 2A, 2B.

It is intended that the drawings show only one exemplary embodiment of the invention, which may vary in form and configuration without departing however from the scope of the concept on which the invention is based. Any reference numerals in the accompanying claims serve merely to facilitate the reading of the claims with reference to the description and the drawings, and do not limit the scope of protection represented by the claims. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A brewing assembly for production of a beverage, the brewing assembly comprising:
   a brewing chamber;
   a support structure carrying a first portion and a second portion of the brewing chamber;
   a boiler for heating water;
   wherein in the brewing assembly: said support structure is subdivided into a first part which is fastened to said first portion of the brewing chamber, and a second part which is fastened to said second portion of the brewing chamber; wherein the first part of the support structure comprises two opposed sides between which the first portion of the brewing chamber is arranged; wherein the second part of the support structure comprises two opposed sides; the first part and the second part of the support structure can be mutually coupled and uncoupled; said first portion of the brewing chamber and said second portion of the brewing chamber are mutually mobile to adopt an open position, and a closed position when the first part and the second part of the support structure are coupled; and said boiler is rigidly connected to the second part of the support structure and to the second portion of the brewing chamber, and is arranged between the two opposed sides of the second part of said structure, and
   wherein said boiler surrounds a duct for supplying the beverage from the brewing chamber.

2. The brewing assembly according to claim 1, wherein said first part of the support structure and the second part of the support structure can be coupled together via reciprocal coupling members.

3. The brewing assembly according to claim 2, wherein said reciprocal coupling members comprise a system of mutual engagement and disengagement, as a result of which the first part of the support structure and the second part of the support structure are connected by the mere reciprocal movement of one part relative to the other.

4. The brewing assembly according to claim 2, wherein when the first part of the support structure and the second part of the support structure are coupled, they form a closed frame within which at least some of the stresses generated by the pressurized water fed into said brewing chamber are unloaded.

5. The brewing assembly according to claim 1, wherein said first portion of the brewing chamber is connected to a drive for coupling to an actuator for opening and closing which moves said first portion of the brewing chamber relative to the support structure.

6. The brewing assembly according to claim 5, wherein: said first part of the support structure defines a loading position of the brewing chamber, in which the first portion of the brewing chamber is arranged beneath a loading hopper for the product to be loaded in the brewing chamber; and wherein said first part of the support structure comprises guides for sliding the first portion of the brewing chamber in order to guide the approaching movement of the first portion of the brewing chamber towards the second portion of the brewing chamber fastened to the second part of the support structure.

7. The brewing assembly according to claim 1, wherein said first portion of the brewing chamber is mobile, relative to the first part of the support structure by a movement of rotation and translation, from a loading position of the product from which the beverage is to be extracted into a closed position in which the first portion of the brewing chamber and the second portion of the brewing chamber define a closed brewing volume.

8. The brewing assembly according to claim 1, wherein said first portion of the brewing chamber comprises a substantially cylindrical, hollow body and a wall for closing said substantially cylindrical body; and wherein said second portion of the brewing chamber comprises a piston for closing said substantially cylindrical body; said piston and said closing wall being mutually opposed when the brewing chamber is closed.

9. The brewing assembly according to claim 8, wherein said closing wall comprises through-holes for feeding pressurized water into the brewing chamber and said piston comprises holes to allow the beverage extracted from said product loaded in the brewing chamber to pass through.

10. The brewing assembly according to claim 8, wherein said closing wall comprises through-holes to allow the beverage extracted from said product loaded in the brewing chamber to pass through, and said piston comprises holes for feeding pressurized water into the brewing chamber.

11. The brewing assembly according to claim 9, wherein a duct for supplying the beverage from the brewing chamber is in fluid connection with said piston.

12. The brewing assembly according to claim 8, wherein said piston is removable from the second part of the support structure.

13. The brewing assembly according to claim 1, wherein said first portion of the brewing chamber and said second portion of the brewing chamber respectively comprise a first connector and a second connector which are mutually mobile in order to hydraulically connect the boiler to the brewing chamber.

14. The brewing assembly according to claim 1, wherein said first portion of the brewing chamber and said second portion of the brewing chamber respectively comprise a first connector and a second connector which are mutually mobile in order to hydraulically connect the brewing chamber to a duct for supplying the beverage from said brewing chamber.

15. The brewing assembly according to claim 13, wherein said first connector and said second connector are formed in one piece with the first portion of the brewing chamber and with the second part of the support structure, the mutual connection of said two connectors being formed by the closing movement of the brewing chamber.

16. A brewing assembly for production of a beverage, the brewing assembly comprising:
a brewing chamber;
a support structure carrying a first portion and a second portion of the brewing chamber;
a boiler for heating water;
wherein in the brewing assembly: said support structure is subdivided into a first part which is fastened to said first portion of the brewing chamber, and a second part which is fastened to said second portion of the brewing chamber; wherein the first part of the support structure comprises two opposed sides between which the first portion of the brewing chamber is arranged; wherein the second part of the support structure comprises two opposed sides; the first part and the second part of the support structure can be mutually coupled and uncoupled; said first portion of the brewing chamber and said second portion of the brewing chamber are mutually mobile to adopt an open position, and a closed position when the first part and the second part of the support structure are coupled; and said boiler is rigidly connected to the second part of the support structure and to the second portion of the brewing chamber, and is arranged between the two opposed sides of the second part of said structure, and
wherein said boiler surrounds a duct for feeding hot water from the boiler to the brewing chamber.

17. A brewing assembly for production of a beverage, the brewing assembly comprising:
a brewing chamber;
a support structure carrying a first portion and a second portion of the brewing chamber;
a boiler for heating water;
wherein in the brewing assembly: said support structure is subdivided into a first part which is fastened to said first portion of the brewing chamber, and a second part which is fastened to said second portion of the brewing chamber; wherein the first part of the support structure comprises two opposed sides between which the first portion of the brewing chamber is arranged; wherein the second part of the support structure comprises two opposed sides; the first part and the second part of the support structure can be mutually coupled and uncoupled; said first portion of the brewing chamber and said second portion of the brewing chamber are mutually mobile to adopt an open position, and a closed position when the first part and the second part of the support structure are coupled; and said boiler is rigidly connected to the second part of the support structure and to the second portion of the brewing chamber, and is arranged between the two opposed sides of the second part of said structure,
wherein said first part of the support structure and the second part of the support structure can be coupled together via reciprocal coupling members, and
wherein said reciprocal coupling members comprise at least one pair of projections and a pair of guides, into which said projections are inserted when the first part of the support structure and the second part of the support structure are mutually coupled, the projections being formed in one piece with one of said first and second parts of the support structure and the guides being formed in one piece with the other of said first and second parts of the support structure.

18. A machine for the production of hot beverages, comprising a housing into which a brewing assembly is inserted, the brewing assembly comprising:
a brewing chamber;
a support structure carrying a first portion and a second portion of the brewing chamber;
a boiler for heating water;
wherein in the brewing assembly: said support structure is subdivided into a first part which is fastened to said first portion of the brewing chamber, and a second part which is fastened to said second portion of the brewing chamber; wherein the first part of the support structure comprises two opposed sides between which the first portion of the brewing chamber is arranged; wherein the second part of the support structure comprises two opposed sides; the first part and the second part of the support structure can be mutually coupled and uncoupled; said first portion of the brewing chamber and said second portion of the brewing chamber are mutually mobile to adopt an open position, and a closed position when the first part and the second part of the support structure are coupled; and said boiler is rigidly connected to the second part of the support structure and to the second portion of the brewing chamber, and is arranged between the two opposed sides of the second part of said structure, and wherein said boiler surrounds a duct for one of supplying the beverage from the brewing chamber and feeding hot water from the boiler to the brewing chamber.

19. The machine according to claim 18, comprising a drive shaft for controlling the opening and closing movement of the brewing chamber of said brewing assembly, and wherein said drive shaft and said first part of the support structure of the brewing chamber move in a mutually engaging and disengaging manner in a direction which is not parallel to the movement of insertion and removal of the brewing assembly into and from said housing.

20. The machine according to claim 18, comprising a drive shaft for controlling the opening and closing movement of the brewing chamber of said brewing assembly, wherein a guide is arranged in said housing for the insertion and removal of the first part of the support structure of the brewing chamber in a direction of insertion and removal, and wherein said drive shaft is orientated with its own shank in a direction which is not parallel to said direction of insertion and removal, and is mobile in the direction of its own shank in order to engage with the brewing assembly and disengage therefrom.

21. The machine according to claim 20, comprising a lever for controlling the movement of engagement and disengagement of the drive shaft relative to the brewing assembly, and wherein said lever is arranged so as to prevent the removal of the first part of the support structure from said housing when the drive shaft is engaged with the brewing assembly.

22. The machine according to claim 20, wherein said first part of the support structure can be taken out from said housing together with said first portion of the brewing chamber while keeping said second part of the support structure, said boiler and said second portion of the brewing chamber in said housing.

\* \* \* \* \*